(12) United States Patent
Imamura et al.

(10) Patent No.: US 12,468,397 B2
(45) Date of Patent: Nov. 11, 2025

(54) SIGNAL PROCESSING DEVICE, SIGNAL PROCESSING METHOD, AND SIGNAL PROCESSING SYSTEM

(71) Applicant: SONY GROUP CORPORATION, Tokyo (JP)

(72) Inventors: Hiroshi Imamura, Tokyo (JP); Toru Nagara, Tokyo (JP); Seishi Tomonaga, Tokyo (JP); Takashi Takamatsu, Tokyo (JP); Koji Nagata, Tokyo (JP); Hiroshi Takeuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 32 days.

(21) Appl. No.: 18/569,242

(22) PCT Filed: Feb. 9, 2022

(86) PCT No.: PCT/JP2022/005153
§ 371 (c)(1),
(2) Date: Dec. 12, 2023

(87) PCT Pub. No.: WO2022/269983
PCT Pub. Date: Dec. 29, 2022

(65) Prior Publication Data
US 2024/0264678 A1   Aug. 8, 2024

(30) Foreign Application Priority Data
Jun. 22, 2021   (JP) .................................. 2021-103260

(51) Int. Cl.
*G06F 3/01*   (2006.01)
(52) U.S. Cl.
CPC .................................. *G06F 3/017* (2013.01)

(58) Field of Classification Search
CPC ....... G01C 21/3664; G01C 21/36; G06F 3/01; G06F 3/017; G06F 3/0304; G06F 3/0346; G06T 7/20; G08G 1/09
See application file for complete search history.

(56) References Cited

U.S. PATENT DOCUMENTS

| | | | |
|---|---|---|---|
| 2011/0234639 A1* | 9/2011 | Shimotani | G01C 21/3664 345/661 |
| 2015/0022439 A1* | 1/2015 | Alameh | G06F 3/017 345/156 |

(Continued)

FOREIGN PATENT DOCUMENTS

| | | |
|---|---|---|
| JP | 2005-293419 A | 10/2005 |
| JP | 2016-126556 A | 7/2016 |

(Continued)

OTHER PUBLICATIONS

International Search Report and Written Opinion of PCT Application No. PCT/JP2022/005153, issued on May 17, 2022, 09 pages of ISRWO.

*Primary Examiner* — Hong Zhou
(74) *Attorney, Agent, or Firm* — CHIP LAW GROUP

(57) ABSTRACT

Provided is a signal processing device that includes a setting unit to set a recognition method for recognizing an operation using a gesture on the basis of first vibration data indicating vibrations predicted to occur in the future, and an operation recognition unit to recognize the operation indicated by the gesture performed by a user in accordance with the recognition method set by the setting unit. The operation recognition unit recognizes the operation indicated by the gesture performed by the user in a vehicle equipped with the signal processing device. The present technology is applicable to, for example, a signal processing device that controls a display device provided in a vehicle.

17 Claims, 21 Drawing Sheets

(56) References Cited

U.S. PATENT DOCUMENTS

| | | |
|---|---|---|
| 2015/0084849 A1* | 3/2015 | Shin .................. G06F 3/016 |
| | | 345/156 |
| 2015/0088336 A1 | 3/2015 | Shin |
| 2015/0301607 A1* | 10/2015 | Saka ............... G06F 3/04817 |
| | | 345/175 |
| 2015/0363639 A1 | 12/2015 | Stanek |
| 2016/0091978 A1* | 3/2016 | Park .................. G06F 3/017 |
| | | 345/156 |
| 2016/0117081 A1* | 4/2016 | Pujia ................ G06F 3/0482 |
| | | 715/771 |
| 2016/0132102 A1* | 5/2016 | Nakagawa ........... G06F 1/1694 |
| | | 345/156 |
| 2018/0335856 A1* | 11/2018 | Wolters ............. G06F 1/1694 |
| 2020/0073481 A1* | 3/2020 | Mizunuma ........... G06F 3/017 |
| 2020/0369269 A1* | 11/2020 | Tanaka ........... G08G 1/096725 |
| 2021/0263586 A1* | 8/2021 | Wang .................. G06F 3/017 |

FOREIGN PATENT DOCUMENTS

| | | |
|---|---|---|
| JP | 2019-095210 A | 6/2019 |
| KR | 10-2018-0120396 A | 11/2018 |
| WO | 2013/145223 A1 | 10/2013 |

\* cited by examiner

FIG. 9

| VIBRATION PATTERN | RANDOMNESS (PERIODIC MAGNITUDE OF VALUE FOR A CERTAIN PERIOD OF TIME) | FREQUENCY/AMPLITUDE | CONTINUITY INTERMITTENT CONTINUOUS |
|---|---|---|---|
| RECOGNITION TARGET | ARM/HAND/FINGER | BODY | HEAD/FACE/LINE-OF-SIGHT |
| DISPLAY RANGE | SMALL | NORMAL | LARGE |
| RECOGNITION RANGE | SMALL | NORMAL | LARGE |
| RECOGNITION DETERMINATION TIME | SHORT 200ms | NORMAL 500ms | LONG 1s OR LONGER |

FIG. 10

| | BEFORE CORRECTION | | BEFORE CORRECTION |
|---|---|---|---|
| VIBRATION PATTERN | ACQUISITION OF VIBRATION DATA | ⇨ | PATTERN CLASSIFICATION RESULT: SUDDEN VIBRATION |
| RECOGNITION TARGET | TARGET: HAND/FINGER | ⇢ NO CHANGE | TARGET: HAND/FINGER |
| DISPLAY RANGE | DISPLAY RANGE: SMALL | ⇢ NO CHANGE | DISPLAY RANGE: SMALL |
| RECOGNITION RANGE | RECOGNITION RANGE: SMALL | ⇢ NO CHANGE | RECOGNITION RANGE: SMALL |
| RECOGNITION DETERMINATION TIME | TIME TAKEN FOR OPERATION RECOGNITION | ⇨ | DISABLE HIGH-IMPACT PORTION |

SIGNAL PROCESSING DEVICE, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2022/005153 filed on Feb. 9, 2022, which claims priority benefit of Japanese Patent Application No. JP 2021-103260 filed in the Japan Patent Office on Jun. 22, 2021. Each of the above-referenced applications is hereby incorporated herein by reference in its entirety.

TECHNICAL FIELD

The present technology relates to a signal processing device, a signal processing method, a recording medium, and a signal processing system, and more particularly, to a signal processing device, a signal processing method, a recording medium, and a signal processing system that enable proper recognition of an operation using a gesture.

BACKGROUND ART

In a case where automated vehicle operation is achieved, an occupant need not drive, so that the occupant can freely spend his/her time in the vehicle. During the free time, it is possible to watch video content for a long time using a display device, for example. In a case of watching the video content at some distance from the display device, it is assumed that the display device is operated using a gesture without touching a physical button.

For example, in a case where a digital device is operated by pointing a fingertip to a user interface (UI) display, vibrations of the vehicle cause the UI display or the fingertip to shake, which may interfere with proper operation of the digital device.

On the other hand, Patent Document 1 discloses a technology to detect the vibrations of the vehicle with an acceleration sensor and change the size of a touch operation active area on the basis of the detected vibrations.

CITATION LIST

Patent Document

Patent Document 1: Japanese Patent Application Laid-Open No. 2016-126556

SUMMARY OF THE INVENTION

Problems to be Solved by the Invention

In the technology disclosed in Patent Document 1, the detected vibration state is fed back to the UI. However, in a case where the technology disclosed in Patent Document 1 is applied to operations performed in the vehicle, the vibration state is fed back to the UI after the vibrations occur, so that a delay occurs before the vibration state is reflected in the UI, and it does not necessarily lead to effective improvements.

The present technology has been made in view of such circumstances, and it is therefore an object of the present technology to enable proper recognition of an operation using a gesture.

Solutions to Problems

A signal processing device according to a first aspect of the present technology includes:
 a setting unit configured to set a recognition method for recognizing an operation using a gesture on the basis of first vibration data indicating vibrations predicted to occur in the future; and
 an operation recognition unit configured to recognize the operation indicated by the gesture performed by a user in accordance with the recognition method set by the setting unit.

A signal processing system according to a second aspect of the present technology includes:
 a signal processing device including a setting unit configured to set a recognition method for recognizing an operation using a gesture on the basis of vibration data indicating vibrations predicted to occur in the future, and an operation recognition unit configured to recognize the operation indicated by the gesture performed by a user in accordance with the recognition method set by the setting unit; and
 a display device including a display unit configured to display an image on which the operation using the gesture is performed.

In the first aspect of the present technology, a recognition method for recognizing an operation using a gesture is set on the basis of the first vibration data indicating vibrations predicted to occur in the future, and the operation indicated by the gesture performed by the user is recognized in accordance with the set recognition method.

In the second aspect of the present technology, a recognition method for recognizing an operation using a gesture is set on the basis of the vibration data indicating vibrations predicted to occur in the future, the operation indicated by the gesture performed by the user is recognized in accordance with the set recognition method, and an image on which the operation using the gesture is performed is displayed.

BRIEF DESCRIPTION OF DRAWINGS

FIG. 9 is a diagram illustrating an example of how to classify vibration patterns and an example of UI correction data.

FIG. 10 is a diagram illustrating an example of how to correct a recognition method for recognizing an operation.

MODE FOR CARRYING OUT THE INVENTION

Hereinafter, a mode for carrying the present technology will be described. Note that the description will be given in the following order.

1. Vibration data management system
2. Configuration of each device
3. Operation of each device
4. Modification example

1. Vibration Data Management System

Figure 1:
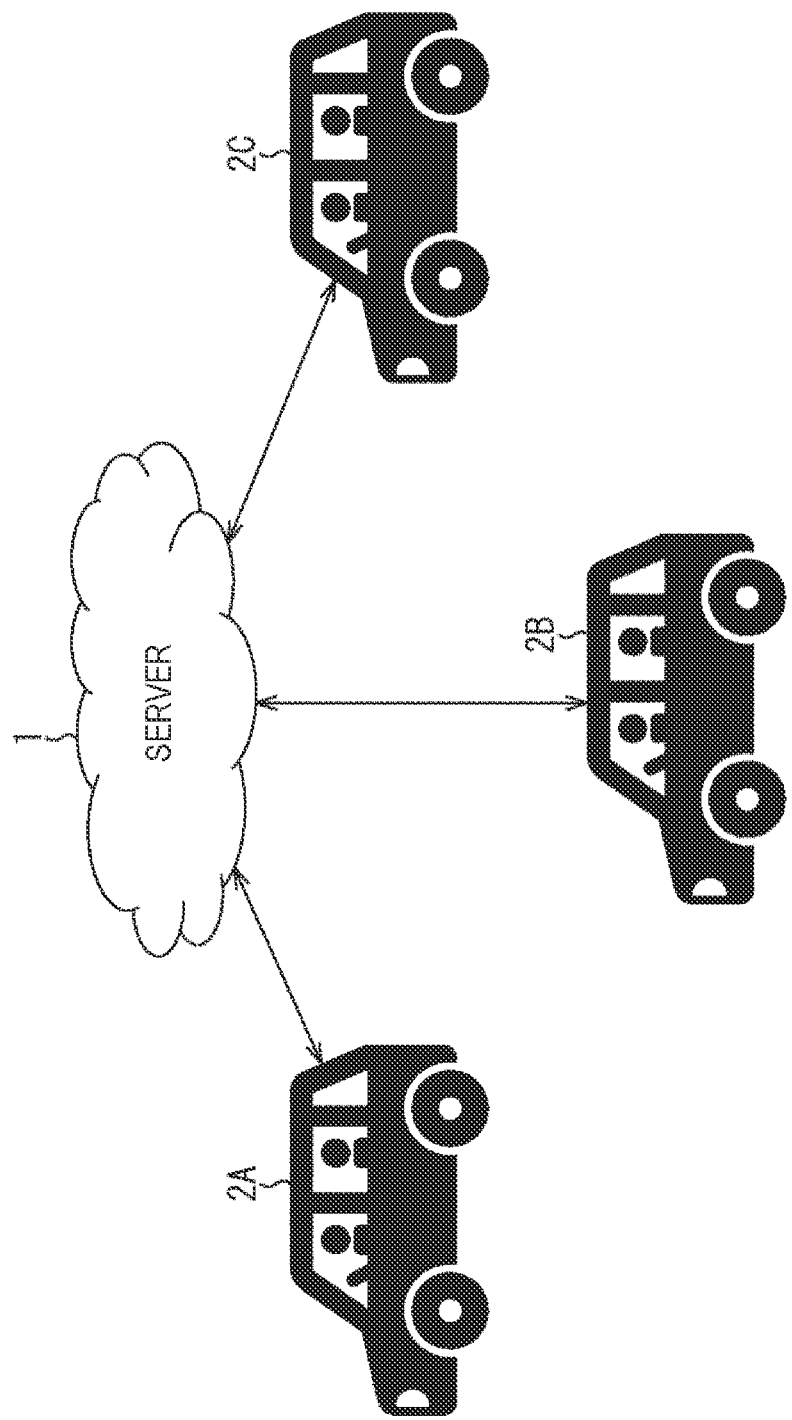
FIG. 1 is a diagram illustrating a configuration example of a vibration data management system according to an embodiment of the p resent technology.

FIG. 1 is a diagram illustrating a configuration example of a vibration data management system according to an embodiment of the present technology.

The vibration data management system illustrated in FIG. 1 is configured by vehicles 2A to 2C connected to a server 1 over a network such as the Internet.

The server 1 manages vibration data representing vibrations detected in the vehicles 2A to 2C.

The vehicles 2A to 2C are each equipped with a signal processing device, a display device, an acceleration sensor, and the like. The signal processing device reproduces video content or the like to display the video content or the like on the display device. The display device displays video content or displays a UI for operating the signal processing device or the like under the control of the signal processing device. The acceleration sensor detects vibrations of each of the vehicles 2A to 2C.

An occupant (user) of each of the vehicles 2A to 2C can operate the display device or the signal processing device using a gesture. Note that, hereinafter, in a case where it is not necessary to distinguish the vehicles 2A to 2C, the vehicles 2A to 2C are simply referred to as vehicle 2.

In FIG. 1, three vehicles 2A to 2C are connected to the server 1, but in practice, any number of vehicles 2 are connected to the server 1, and vibration data representing vibrations detected in each vehicle 2 is managed by the server 1.

Figure 2:
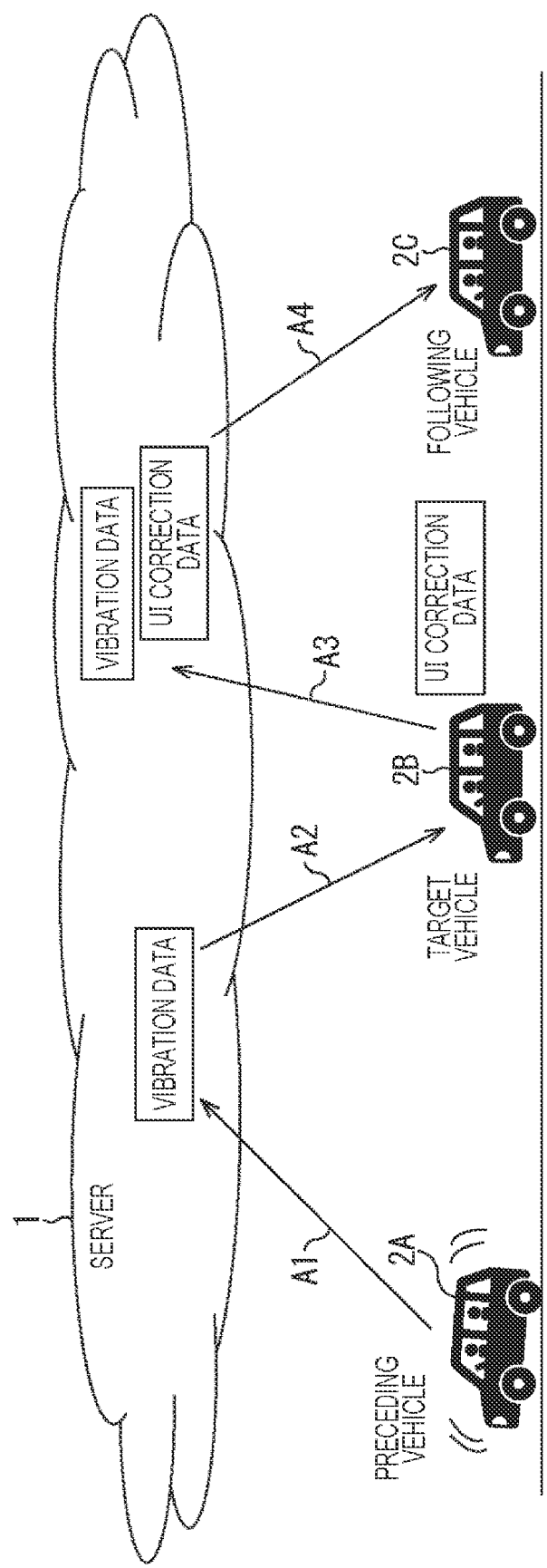
FIG. 2 is a diagram illustrating a data flow in the vibration data management system.

FIG. 2 is a diagram illustrating a data flow in the vibration data management system.

In the example illustrated in FIG. 2, the vehicles 2A to 2C travel through the same position in order of the vehicle 2A, the vehicle 2B, and the vehicle 2C. Hereinafter, the vehicle 2A is also referred to as preceding vehicle 2A, the vehicle 2B is also referred to as target vehicle 2B, and the vehicle 2C is also referred to as following vehicle 2C. Hereinafter, unless otherwise specified, a case where the preceding vehicle 2A, the target vehicle 2B, and the following vehicle 2C are of the same vehicle type will be described.

Figure 3:
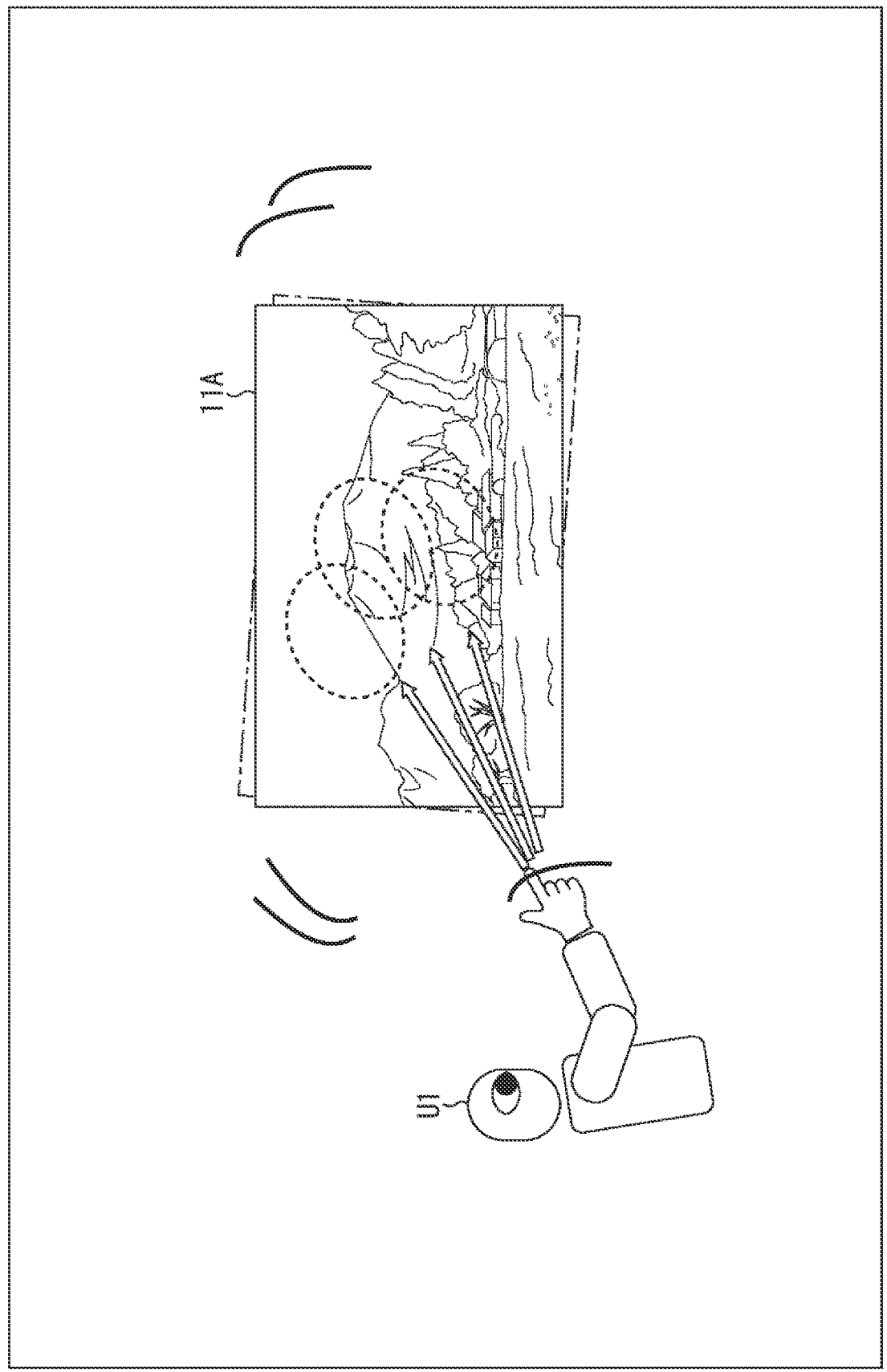
FIG. 3 is a diagram illustrating how an occupant of a preceding vehicle performs an operation using a gesture.

FIG. 3 is a diagram illustrating how the occupant of the preceding vehicle 2A performs an operation using a gesture.

In the example illustrated in FIG. 3, the video content is displayed by a display device 11A provided in the preceding vehicle 2A. The occupant U1 of the preceding vehicle 2A can control the signal processing device by, for example, pointing his/her fingertip to a predetermined position on the display device 11A in the preceding vehicle 2A.

While traveling, the preceding vehicle 2A undergoes vibrations caused by unevenness of a road or the like. As illustrated in FIG. 3, the vibrations of the preceding vehicle 2A cause the display device 11A or the fingertip of the occupant U1 to shake. Even if the occupant tries to point the fingertip to a predetermined range of the video content, the shake of the display device 11A or the fingertip causes the range to which the fingertip is pointed to move as indicated by three dashed ellipses, for example. Therefore, the range to which it is recognized that the fingertip is pointed is not stable, and an operation different from the intention of the occupant U1 may be performed by the signal processing device.

On the other hand, in a case where the preceding vehicle 2A detects vibrations while traveling, as indicated by an arrow A1 in FIG. 2, the preceding vehicle 2A transmits vibration data indicating the detected vibrations to the server 1 together with vehicle information indicating the vehicle type of the preceding vehicle 2A and position information indicating the position where the preceding vehicle 2A is traveling.

The server 1 stores the vibration data transmitted from the preceding vehicle 2A with the vibration data associated with a position on map data indicated by the position information. The map data is data for the server 1 to collectively manage vibration data and the like at a plurality of positions. That is, the vibration data is stored as travel data at the position where the preceding vehicle 2A is traveling.

As indicated by an arrow A2, the target vehicle 2B acquires vibration data associated with a predicted position indicating a future traveling position from the server 1. For example, vibration data acquired by the vehicle 2 of a vehicle type corresponding to the vehicle type of the target vehicle 2B is acquired from the server 1. The vehicle type corresponding to the vehicle type of the target vehicle 2B is, for example, the same vehicle type as the vehicle type of the target vehicle 2B or a vehicle type similar to the vehicle type of the target vehicle 2B. Here, the vibration data acquired by the preceding vehicle 2A is acquired from the server 1.

The target vehicle 2B analyzes a pattern and magnitude of vibrations predicted to occur at the predicted position on the basis of the vibration data acquired from the server 1, and changes a recognition method for recognizing an operation using a gesture in accordance with the result of analyzing the vibrations. As indicated by an arrow A3, the target vehicle 2B transmits, to the server 1, UI correction data used to change the recognition method for recognizing an operation together with vibration data indicating vibrations actually detected at the predicted position. Vehicle information indicating the vehicle type of the target vehicle 2B and position information indicating the position where the target vehicle 2B is traveling are transmitted to the server 1 together with the vibration data and the UI correction data.

The server 1 stores the vibration data and the UI correction data transmitted from the target vehicle 2B with the vibration data and the UI correction data associated with a position on the map data indicated by the position information. As a result, the vibration data acquired by the preceding vehicle 2A and the vibration data and the UI correction data acquired by the target vehicle 2B are associated with one position.

As indicated by an arrow A4, the following vehicle 2C acquires vibration data and UI correction data associated with the predicted position from the server 1. Here, the vibration data acquired by the preceding vehicle 2A and the vibration data acquired by the target vehicle 2B are acquired from the server 1. Furthermore, the UI correction data used in the target vehicle 2B is acquired from the server 1.

The following vehicle 2C analyzes a pattern and magnitude of vibrations that occur at the predicted position on the basis of the vibration data acquired from the server 1, and changes the recognition method for recognizing an operation using a gesture in accordance with the result of analyzing the vibrations. Moreover, the following vehicle 2C corrects the recognition method for recognizing an operation as necessary on the basis of the UI correction data acquired from the server 1.

Figure 4A:
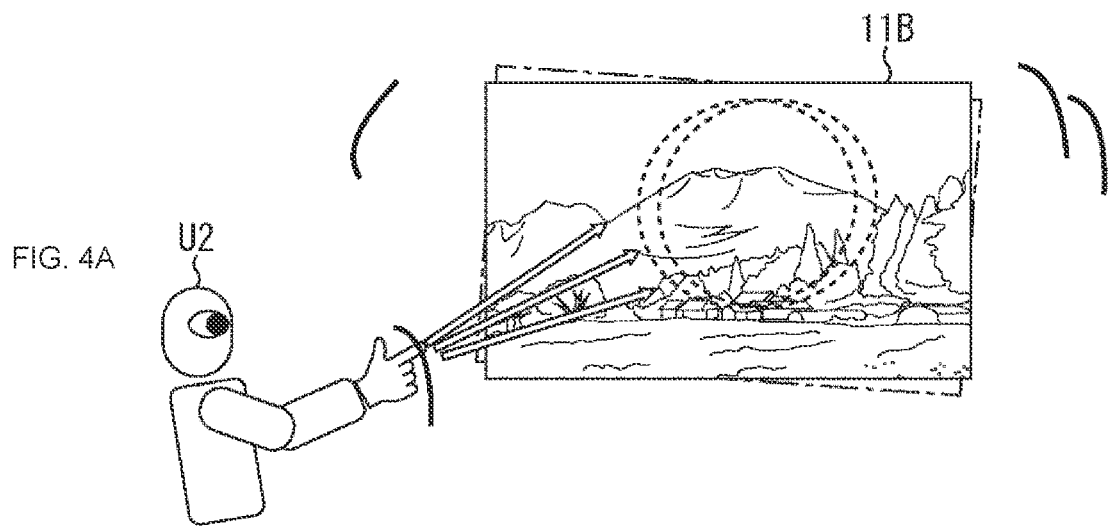
FIGS. 4A and 4B are diagrams illustrating how occupants of a target vehicle and a following vehicle each perform an operation using a gesture.
Figure 4B:
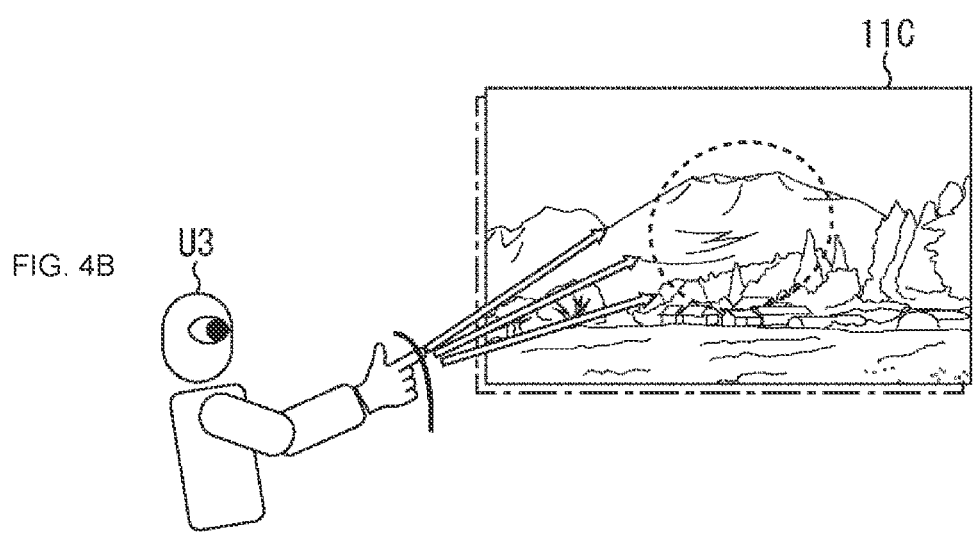

FIGS. 4A and 4B are diagrams illustrating how the occupants of the target vehicle 2B and the following vehicle 2C each perform an operation using a gesture.

In the example illustrated in FIG. 4A, the video content is displayed by a display device 11B provided in the target vehicle 2B. Similarly to the occupant U1 of the preceding vehicle 2A, the occupant U2 of the target vehicle 2B can control the signal processing device by pointing his/her fingertip to a predetermined position on the display device 11B in the target vehicle 2B.

As illustrated in FIG. 4A, even if the display device 11B or the fingertip of the occupant U2 shakes due to the vibrations of the target vehicle 2B, extending a range in which it is recognized as an operation allows the signal processing device to recognize either one of the ranges indicated by two dashed ellipses as a range to which the fingertip is pointed, for example. As a result, the target vehicle 2B can recognize the operation of pointing the fingertip toward the display device 11B more stably than the preceding vehicle 2A, and can prevent, for example, when vibrations occur suddenly, an operation different from the operation intended by the occupant U2 from being recognized.

In the example illustrated in FIG. 4B, the video content is displayed by a display device 11C provided in the following vehicle 2C. Similarly to the occupant U1 of the preceding vehicle 2A and the occupant U2 of the target vehicle 2B, the occupant U3 of the following vehicle 2C can control the signal processing device by pointing his/her fingertip to a predetermined position on the display device 11C in the following vehicle 2C.

As illustrated in FIG. 4B, even if the display device 11C or the fingertip of the occupant U3 shake due to the vibrations of the following vehicle 2C, changing the recognition method for recognizing an operation using a gesture in consideration of the influence of the vibrations allows the signal processing device to recognize the range indicated by one dashed ellipse as a range to which the fingertip is pointed, for example. The following vehicle 2C can recognize, by using the UI correction data in addition to the vibration data, the operation of pointing the fingertip to the display device 11C more stably than the preceding vehicle 2A and the target vehicle 2B. As a result, the following vehicle 2C can more reliably prevent, when vibrations occur, an operation different from the operation intended by the occupant U3 from being recognized.

As described above, the target vehicle 2B and the following vehicle 2C can provide a stable operation environment while traveling during which the vibration intensity dynamically changes. Dynamically changing the recognition method for recognizing an operation in accordance with the pattern or magnitude of vibrations allows the occupant to comfortably use the display content without manually changing the setting of the recognition method for recognizing an operation to adapt to the traveling environment, for example.

2. Configuration of Each Device

<Configuration of Server>

Figure 5:
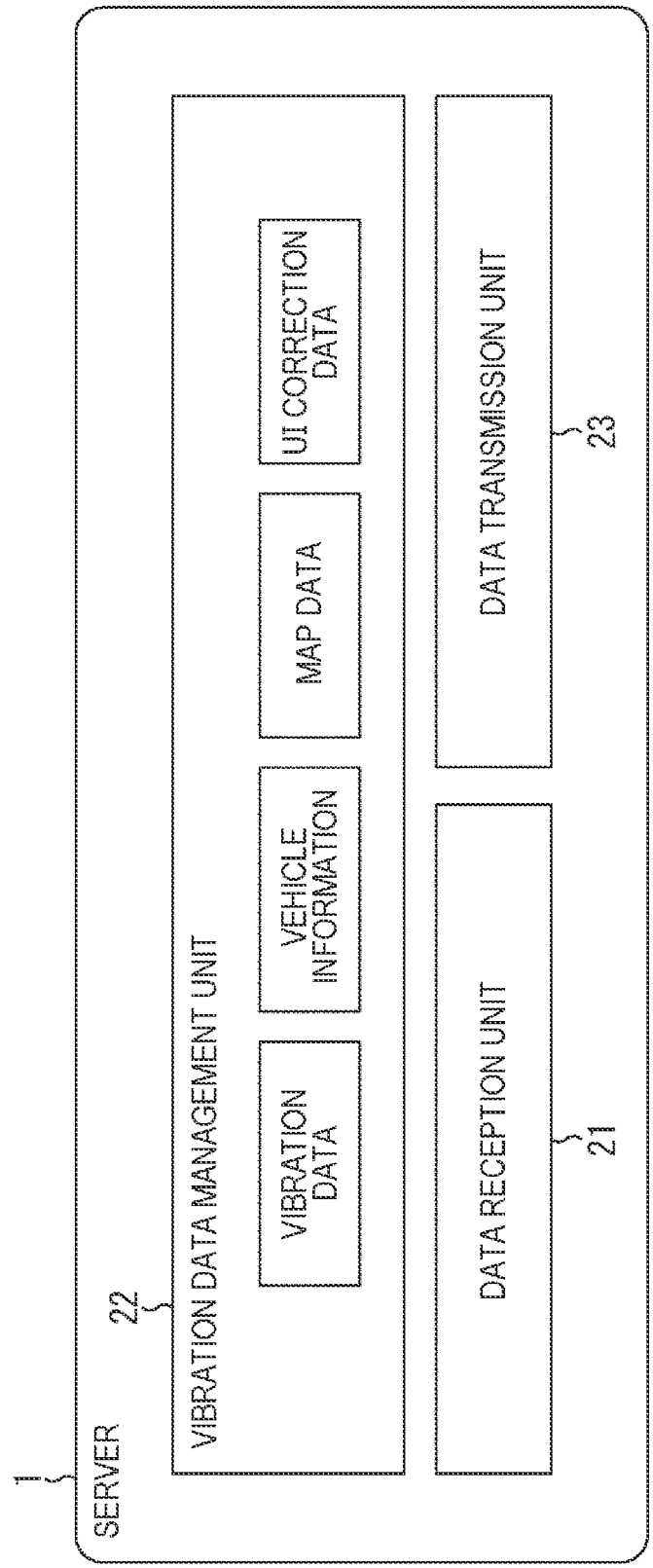
FIG. 5 is a block diagram illustrating a configuration example of a server.

FIG. 5 is a block diagram illustrating a configuration example of the server 1.

As illustrated in FIG. 5, the server 1 includes a data reception unit 21, a vibration data management unit 22, and a data transmission unit 23.

The data reception unit 21 receives the vibration data, the vehicle information, the position information, and the UI correction data transmitted from the vehicle 2, and supplies the vibration data, the vehicle information, the position information, and the UI correction data to the vibration data management unit 22.

The vibration data management unit 22 stores the vibration data and the UI correction data supplied from the data reception unit 21 with the vibration data and the UI correction data associated with the position on the map data indicated by the position information. The vibration data management unit 22 labels the vibration data with the vehicle information.

In response to a request from the vehicle 2, the data transmission unit 23 acquires the vibration data and the UI correction data associated with the predicted position of the vehicle 2 from the vibration data management unit 22 and transmits the vibration data and the UI correction data to the vehicle 2.

<Configuration of Preceding Vehicle>

Figure 6:
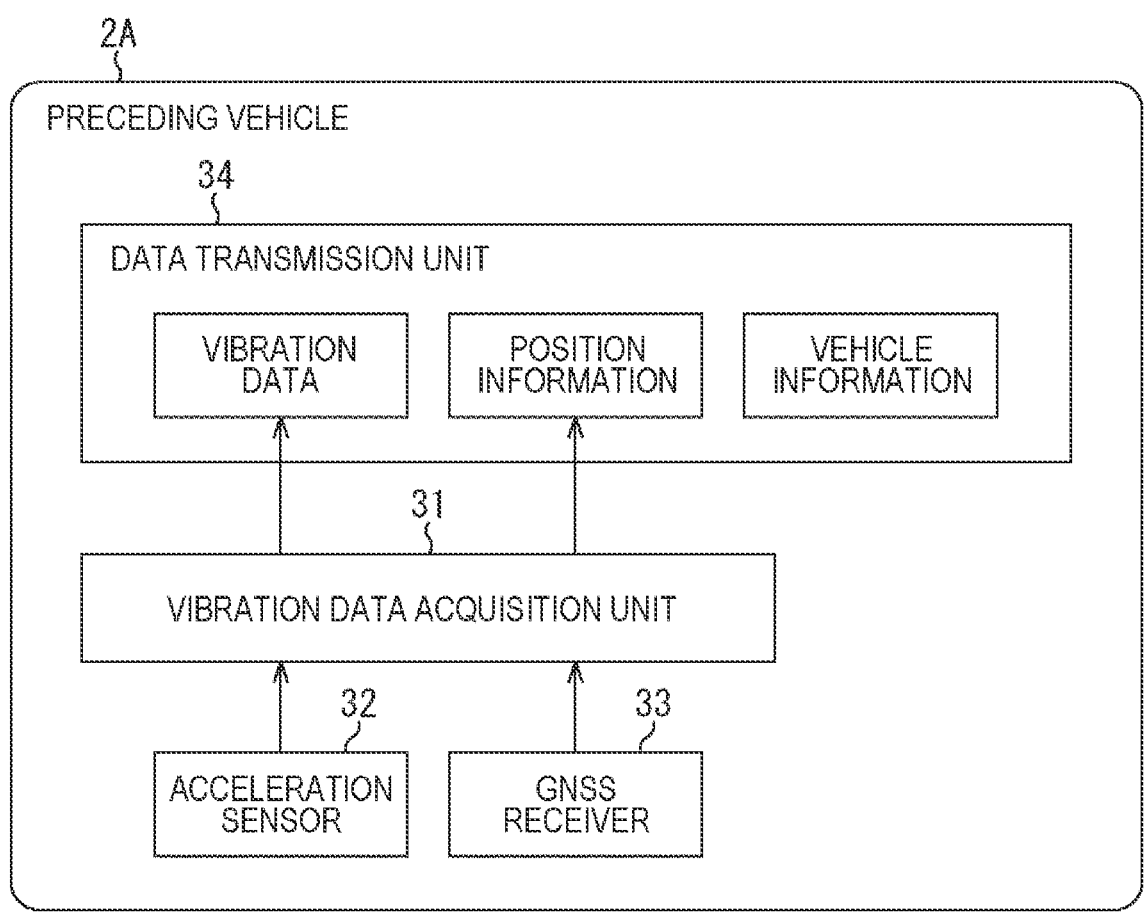
FIG. 6 is a block diagram illustrating a configuration example of the preceding vehicle.

FIG. 6 is a block diagram illustrating a configuration example of the preceding vehicle 2A.

As illustrated in FIG. 6, the preceding vehicle 2A includes a vibration data acquisition unit 31, an acceleration sensor 32, a global navigation satellite system (GNSS) receiver 33, and a data transmission unit 34. A part of the configuration of the preceding vehicle 2A is implemented by a predetermined program that is executed by the signal processing device provided in the preceding vehicle 2A.

The vibration data acquisition unit 31 acquires vibration data from the acceleration sensor 32 and acquires position information from the GNSS receiver 33. The vibration data acquisition unit 31 supplies, to the data transmission unit 34, the vibration data with the vibration data associated with the position information and the vehicle information.

The acceleration sensor 32 detects vibrations generated in the preceding vehicle 2A, acquires vibration data indicating the result of detecting the vibrations, and supplies the vibration data to the vibration data acquisition unit 31.

The GNSS receiver 33 detects a traveling position of the preceding vehicle 2A on the basis of a signal received from a GNSS satellite, acquires position information indicating the result of detecting the traveling position, and supplies the position information to the vibration data acquisition unit 31.

The data transmission unit 34 transmits the vibration data supplied from the vibration data acquisition unit 31 to the server 1 together with the position information and the vehicle information.

Note that, in FIG. 6, only the configuration for acquiring the vibration data and transmitting the vibration data to the server 1 has been described as the configuration of the preceding vehicle 2A, but a configuration for displaying the UI can also be provided in the preceding vehicle 2A. In this case, a configuration similar to the configuration of the target vehicle 2B to be described later is provided in the preceding vehicle 2A.

<Configuration of Target Vehicle>
Overall Configuration

Figure 7:
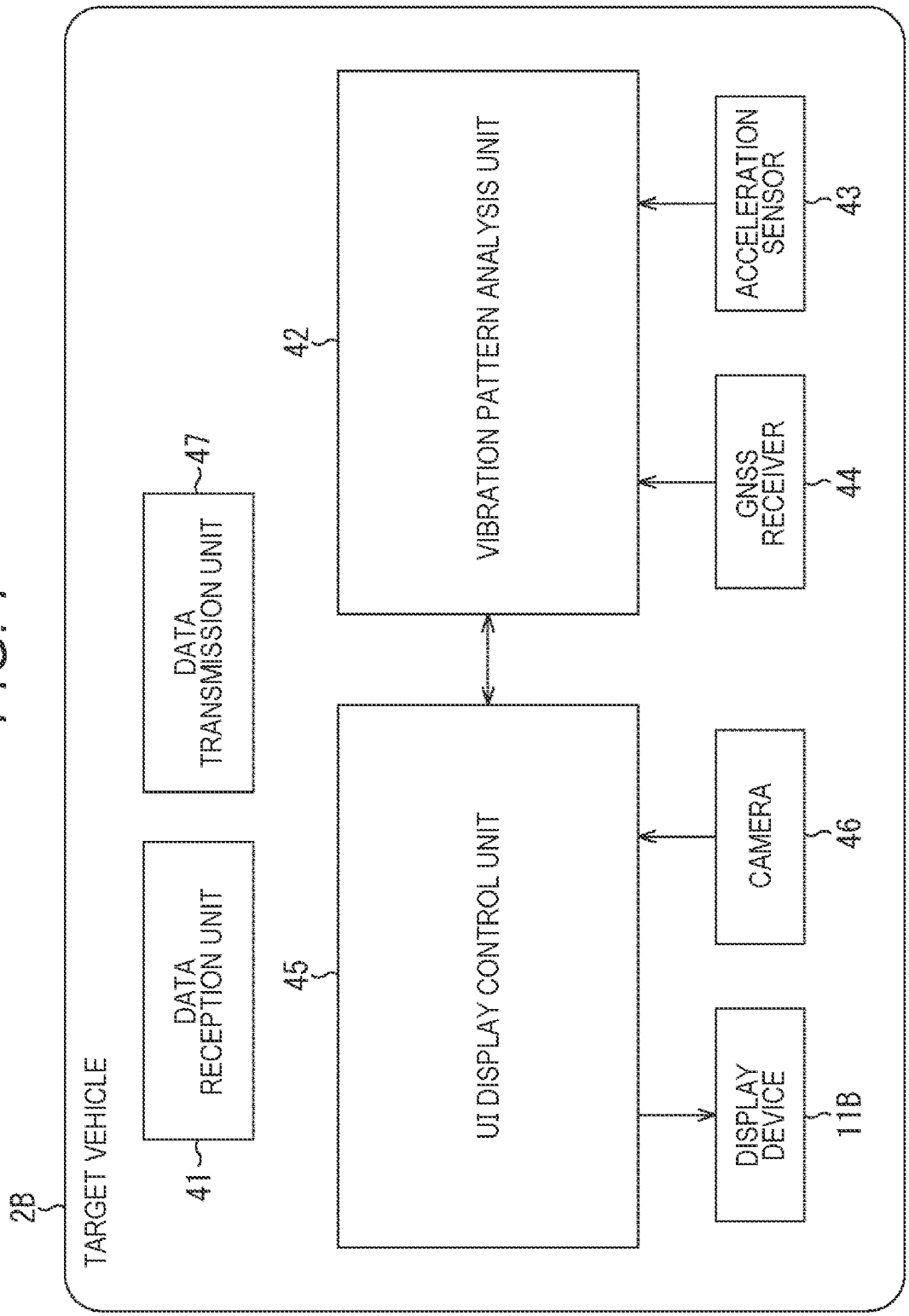
FIG. 7 is a block diagram illustrating a configuration example of the target vehicle.

FIG. 7 is a block diagram illustrating a configuration example of the target vehicle 2B.

As illustrated in FIG. 7, the target vehicle 2B includes a data reception unit 41, a vibration pattern analysis unit 42, an acceleration sensor 43, a GNSS receiver 44, a UI display control unit 45, a camera 46, a data transmission unit 47, and the display device 11B. A part of the configuration of the target vehicle 2B is implemented by a predetermined program that is executed by the signal processing device provided in the target vehicle 2B.

The data reception unit 41 acquires vibration data associated with the predicted position of the target vehicle 2B from the server 1. Specifically, the data reception unit 41 requests vibration data labeled with the vehicle information indicating a vehicle type corresponding to the vehicle type of the target vehicle 2B from the server 1 to acquire the vibration data from the server 1. The vibration data acquired from the server 1 is supplied to the vibration pattern analysis unit 42.

The vibration pattern analysis unit 42 analyzes a pattern and magnitude of vibrations that occur at the predicted position on the basis of the vibration data supplied from the data reception unit 41. The vibration pattern analysis unit 42 generates UI correction data on the basis of the analysis result and supplies the UI correction data to the UI display control unit 45.

Furthermore, the vibration pattern analysis unit 42 acquires position information from the GNSS receiver 44, determines a future traveling position of the target vehicle 2B as the predicted position on the basis of the position information, and controls the data reception unit 41 to acquire the vibration data associated with the predicted position from the server 1.

Moreover, the vibration pattern analysis unit 42 acquires vibration data from the acceleration sensor 43, and supplies, to the data transmission unit 47, the vibration data with the vibration data associated with the UI correction data, the position information, and the vehicle information.

The acceleration sensor 43 detects vibrations generated in the target vehicle 2B, acquires vibration data indicating the result of detecting the vibrations, and supplies the vibration data to the vibration pattern analysis unit 42.

The GNSS receiver 44 detects a traveling position of the target vehicle 2B on the basis of a signal received from a GNSS satellite, acquires position information indicating the result of detecting the traveling position, and supplies the position information to the vibration pattern analysis unit 42.

The UI display control unit 45 acquires image data from the camera 46 and recognizes an operation using a gesture performed by the occupant on the basis of the image data. At this time, the UI display control unit 45 corrects the recognition method for recognizing an operation on the basis of the UI correction data supplied from the vibration pattern analysis unit 42. In other words, the UI display control unit 45 recognizes the operation using a gesture performed by the occupant in accordance with the recognition method for recognizing an operation set by the vibration pattern analysis unit 42.

The UI display control unit 45 operates in accordance with the operation using a gesture performed by the occupant. For example, the UI display control unit 45 causes the display device 11B to display necessary information or video content in a vehicle interior space.

The camera 46 is provided in the target vehicle 2B. The camera 46 captures an image of the vehicle interior space of the target vehicle 2B, acquires image data indicating a moving image captured of the occupant, and supplies the image data to the UI display control unit 45.

The data transmission unit 47 transmits, to the server 1, the vibration data, the UI correction data, the position information, and the vehicle information supplied from the vibration pattern analysis unit 42.

Configuration of Vibration Pattern Analysis Unit

Figure 8:
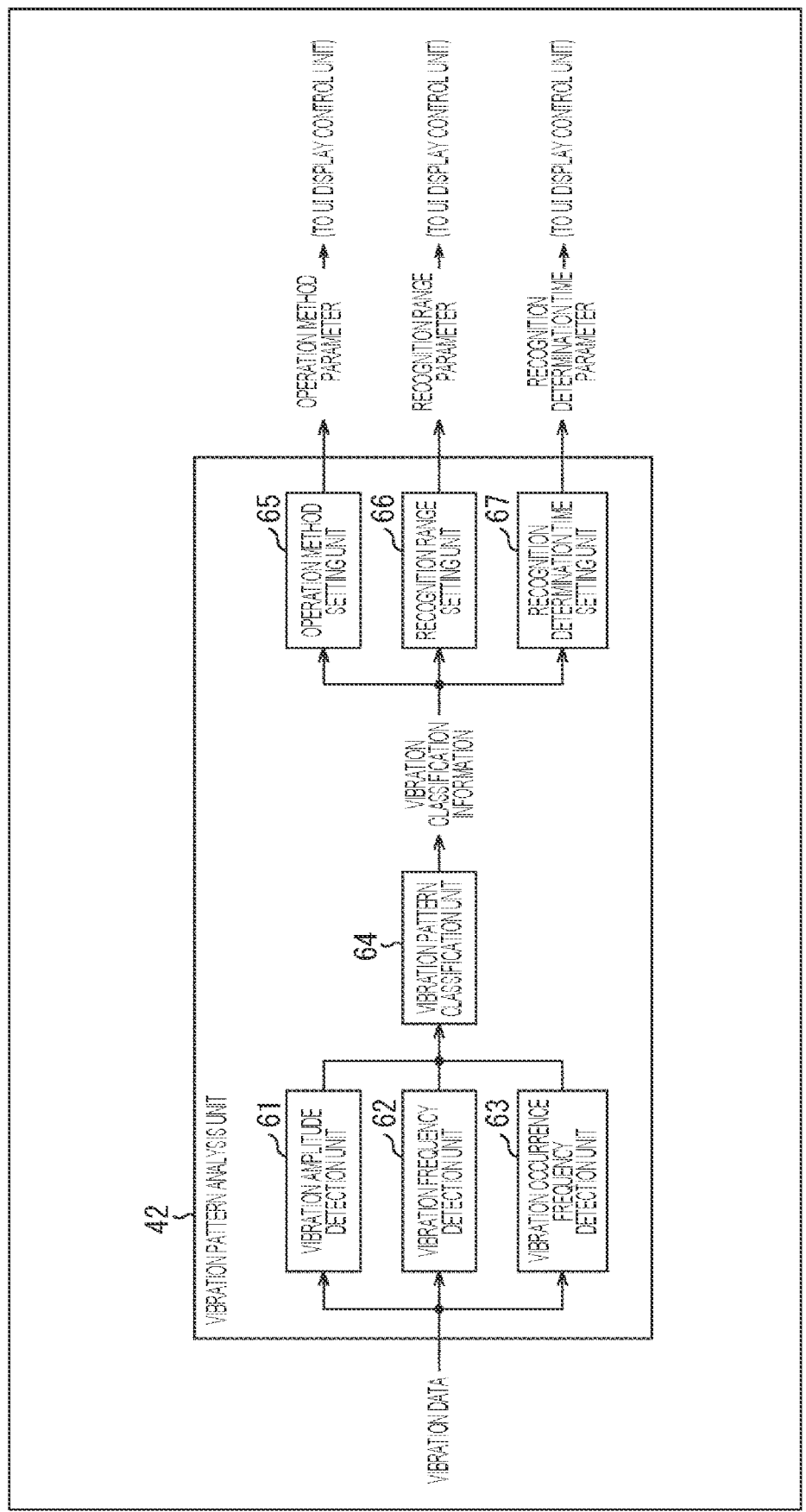
FIG. 8 is a block diagram illustrating a detailed configuration example of a vibration pattern analysis unit.

FIG. 8 is a block diagram illustrating a detailed configuration example of the vibration pattern analysis unit 42.

As illustrated in FIG. 8, the vibration pattern analysis unit 42 includes a vibration amplitude detection unit 61, a vibration frequency detection unit 62, a vibration occurrence frequency detection unit 63, a vibration pattern classification unit 64, an operation method setting unit 65, a recognition range setting unit 66, and a recognition determination time setting unit 67.

The same vibration data is supplied from the data reception unit 41 to the vibration amplitude detection unit 61, the vibration frequency detection unit 62, and the vibration occurrence frequency detection unit 63.

The vibration amplitude detection unit 61 detects an amplitude of vibrations indicated by the vibration data. For example, a mean value of amplitudes generated for each generation frequency is detected as the amplitude. Information indicating the amplitude is supplied to the vibration pattern classification unit 64.

The vibration frequency detection unit 62 detects a frequency of the vibrations indicated by the vibration data. For example, a generation frequency of vibrations is detected as the frequency. Information indicating the frequency is supplied to the vibration pattern classification unit 64.

The vibration occurrence frequency detection unit 63 detects continuity of the vibrations indicated by the vibration data. For example, a ratio of vibrations generated for each generation frequency to a unit time (for example, 1 sec) is detected as the continuity. Furthermore, the vibration occurrence frequency detection unit 63 detects randomness of the vibrations indicated by the vibration data. For example, at least one of the number of pulses having an amplitude equal to or larger than the mean amplitude within the unit time or a variance of the amplitudes is detected as the randomness. Information indicating the continuity and the randomness is supplied to the vibration pattern classification unit 64.

As described above, the vibration amplitude detection unit 61, the vibration frequency detection unit 62, and the vibration occurrence frequency detection unit 63 quantify the four characteristics indicating the behavior of vibrations on the basis of the vibration data, and generate vibration characteristic data in the following format.

Vibration characteristic data=(randomness, frequency, amplitude, continuity)

The vibration pattern classification unit 64 classifies patterns of vibrations that occur at the predicted position on the basis of the vibration characteristic data generated by the vibration amplitude detection unit 61, the vibration frequency detection unit 62, and the vibration occurrence frequency detection unit 63. The vibrations that occur at the predicted position are classified into patterns according to the randomness, the frequency, the magnitude (amplitude), and the continuity illustrated in the first row of FIG. 9.

Specifically, the vibrations that occur at the predicted position are classified into patterns such as a pattern in which vibrations suddenly occur and have randomness or a pattern in which vibrations regularly occur. Vibration classification information indicating the patterns of vibrations that occur at the predicted position is supplied to the operation method setting unit 65, the recognition range setting unit 66, and the recognition determination time setting unit 67.

The operation method setting unit 65 sets an operation method usable by the occupant, specifically, a type of a gesture usable by the occupant, in accordance with the vibration classification information supplied from the vibration pattern classification unit 64. For example, the operation method setting unit 65 selects a part of the occupant usable for the gesture, and sets the gesture using the selected part as a recognition target. As illustrated in the second row of FIG. 9, for example, a gesture using at least one of an arm, a hand, a finger, a body, a head, a face, or a line-of-sight is set as the recognition target.

The operation method setting unit 65 supplies an operation method parameter indicating whether or not the gesture using each part is the recognition target to the UI display control unit 45. The operation method parameter is defined in the following format, for example. The value 1 indicates that it is the recognition target, and the value 0 indicates that it is not the recognition target. In the following example, a gesture using an arm, a hand, and a finger is set as the recognition target, and a gesture using a body, a head, a face, and a line-of-sight is not set as the recognition target.

(arm, hand, finger, body, head, face, line-of-sight)=(1, 1, 1, 0, 0, 0, 0)

The recognition range setting unit 66 sets a recognition range in accordance with the vibration classification information supplied from the vibration pattern classification unit 64. The recognition range is a range in which the gesture performed by the occupant on a display range of the UI is recognized as an operation.

The fourth row of FIG. 9 illustrates an example of how to set the recognition range. The bold rectangle indicates the display device 11B, and the dashed rectangle indicates the recognition range. Furthermore, the gray-filled rectangle indicates the display range of the UI displayed on the display device 11B. An image to be operated, such as a button or an icon, is displayed as the UI. For example, in a case where it is recognized that the fingertip of the occupant points to within the recognition range, it is determined that the operation of selecting the UI has been performed.

For example, the recognition range is set to any one of a small range, a normal range, or a large range relative to the display range of the UI. For example, in a case where the recognition range is set to the small range, the recognition range is set to a range smaller than the normal range, and is set to a range almost the same as the display range. In a case where the recognition range is set to the large range, the recognition range is set to a range larger than the normal range, and is set to a range obtained by greatly extending the display range.

Furthermore, as illustrated in the third row of FIG. 9, it is possible to substantially change the recognition range by changing the display range of the UI. The display range of the UI is set to any one of a small range, a normal range, or a large range. In a case where the display range of the UI is set to the small range, the display range of the UI is set to a range smaller than the normal range. In a case where the display range of the UI is set to the large range, the display range of the UI is set to a range larger than the normal range. The display range of the UI is also changed by, for example, the recognition range setting unit 66.

Note that in a case where the recognition range is changed, both the recognition range and the display range may be changed, or only either one of the recognition range and the display range may be changed.

The recognition range setting unit 66 supplies a recognition range parameter indicating the recognition range to the UI display control unit 45. The recognition range parameter is defined in the following format, for example. (x, y) denotes display coordinates of an image displayed as the UI. k denotes the display range of the image of the UI. For example, in a case where the display range is the small range, k is set to 0, in a case where the display range is the normal range, k is set to 1, and in a case where the display range is the large range, k is set to 2. f denotes the recognition range. For example, in a case where the recognition range is the small range, f is set to 0, in a case where the recognition range is the normal range, f is set to 1, and in a case where the recognition range is the large range, f is set to 2.

$$(x, y, k, f) = (0, 0, 1, 1)$$

Note that, even if the setting of the display range is the same, the size of the image of the UI to be displayed changes in a manner that depends on the resolution of the display device 11B.

The recognition determination time setting unit 67 sets a recognition determination time and whether or not to apply a recognition disabled period in accordance with the vibration classification information supplied from the vibration pattern classification unit 64. The recognition determination time is the duration of a gesture in which the gesture is recognized as an operation. For example, in a case where the gesture of pointing the fingertip to within the recognition range for the recognition determination time is recognized, it is recognized that the operation of selecting the UI has been performed. As illustrated in the fifth row of FIG. 9, for example, any one of 200 ms (short), 500 ms (normal), and 1 s or longer (long) is set as the recognition determination time.

The recognition disabled period is a period during which the recognition of a gesture is disabled. For example, the duration of an event such as vibrations having an amplitude larger than a predetermined threshold that causes a reduction in accuracy of gesture recognition is set as the recognition disabled period. In a case where the recognition disabled period is applied, the duration of a gesture is measured excluding the recognition disabled period. On the other hand, in a case where the recognition disabled period is not applied, the duration of a gesture is measured without excluding the recognition disabled period.

The recognition determination time setting unit 67 supplies, to the UI display control unit 45, a recognition determination time parameter indicating the recognition determination time and whether or not to apply the recognition disabled period.

The operation method parameter, the recognition range parameter, and the recognition determination time parameter indicating the recognition method for recognizing an operation as described above are used as the UI correction data to correct the recognition method for recognizing an operation by the UI display control unit 45.

FIG. 10 is a diagram illustrating an example of how to correct the recognition method for recognizing an operation.

In the example illustrated in FIG. 10, as illustrated in the first row, the occurrence of sudden vibrations at the predicted position is detected by classifying the vibration patterns indicated by the vibration data. For example, in a case where an amplitude larger than the predetermined threshold appears singly or intermittently in the vibration data, it is determined that sudden vibrations occurs at the predicted position.

In this case, the operation method setting unit 65 generates an operation method parameter indicating that the gesture using the hand and finger of the occupant is the recognition target. Therefore, as illustrated in the second row of FIG. 10, in a case where the gesture using the hand and finger is set as the recognition target before the correction of the recognition method for recognizing an operation, the recognition target is not changed even after the correction of the recognition method for recognizing an operation.

Furthermore, the recognition range setting unit 66 generates a recognition range parameter indicating that the display range of the UI and the recognition range are each the small range. Therefore, as illustrated in the third and fourth rows of FIG. 10, in a case where the display range of the UI and the recognition range are each set to the small range before the correction of the recognition method for recognizing an operation, the display range of the UI and the recognition range are not changed even after the correction of the recognition method for recognizing an operation.

The recognition determination time setting unit 67 generates a recognition determination time parameter that includes the recognition determination time, and indicates that the recognition disabled period is applied. Therefore, as illustrated in the fifth row of FIG. 10, in a case where a duration of a state in which the occupant points the fingertip to within the recognition range becomes equal to the recognition determination time before the correction of the recognition method for recognizing an operation, it is determined (recognized) that the operation has been performed. On the other hand, after the correction of the recognition method for recognizing an operation, in a case where the duration of the state in which the occupant points the fingertip to within the recognition range becomes equal to a recognition determination period in a period excluding the recognition disabled period in which the accuracy of operation recognition deteriorates due to a large amplitude of vibrations, it is determined that the operation has been performed.

Note that, before the correction of the recognition method for recognizing an operation, a gesture observation time until it is determined that the operation has been performed coincides with the recognition determination time.

On the other hand, after the correction of the recognition method for recognizing an operation, the gesture observation time until it is determined that the operation has been performed may be longer than the recognition determination time. That is, in a case where the recognition disabled period occurs during the gesture observation, the gesture observation time until it is determined that the operation has been performed is a time obtained by adding the length of the recognition disabled period to the recognition determination time.

For example, in a case where the recognition method for recognizing an operation is not corrected, the fingertip or the display device 11B may shake due to sudden vibrations, and the direction of the fingertip may fall out of the recognition range. As a result, even if the occupant intends to perform the operation, the result of recognizing the operation becomes unstable; for example, the gesture of the occupant is not recognized as the operation.

On the other hand, disabling the gesture recognition over the recognition disabled period in which sudden vibrations occur allows the gesture of the occupant to be recognized as the operation as long as, even if the direction of the fingertip falls out of the recognition range due to the sudden vibrations, the state in which the direction of the fingertip is within the recognition range continues only for the recognition determination time in a period excluding the recognition disabled period. Therefore, even if vibrations occur in the target vehicle 2B, it is possible to stably recognize the operation using a gesture.

Figure 11:
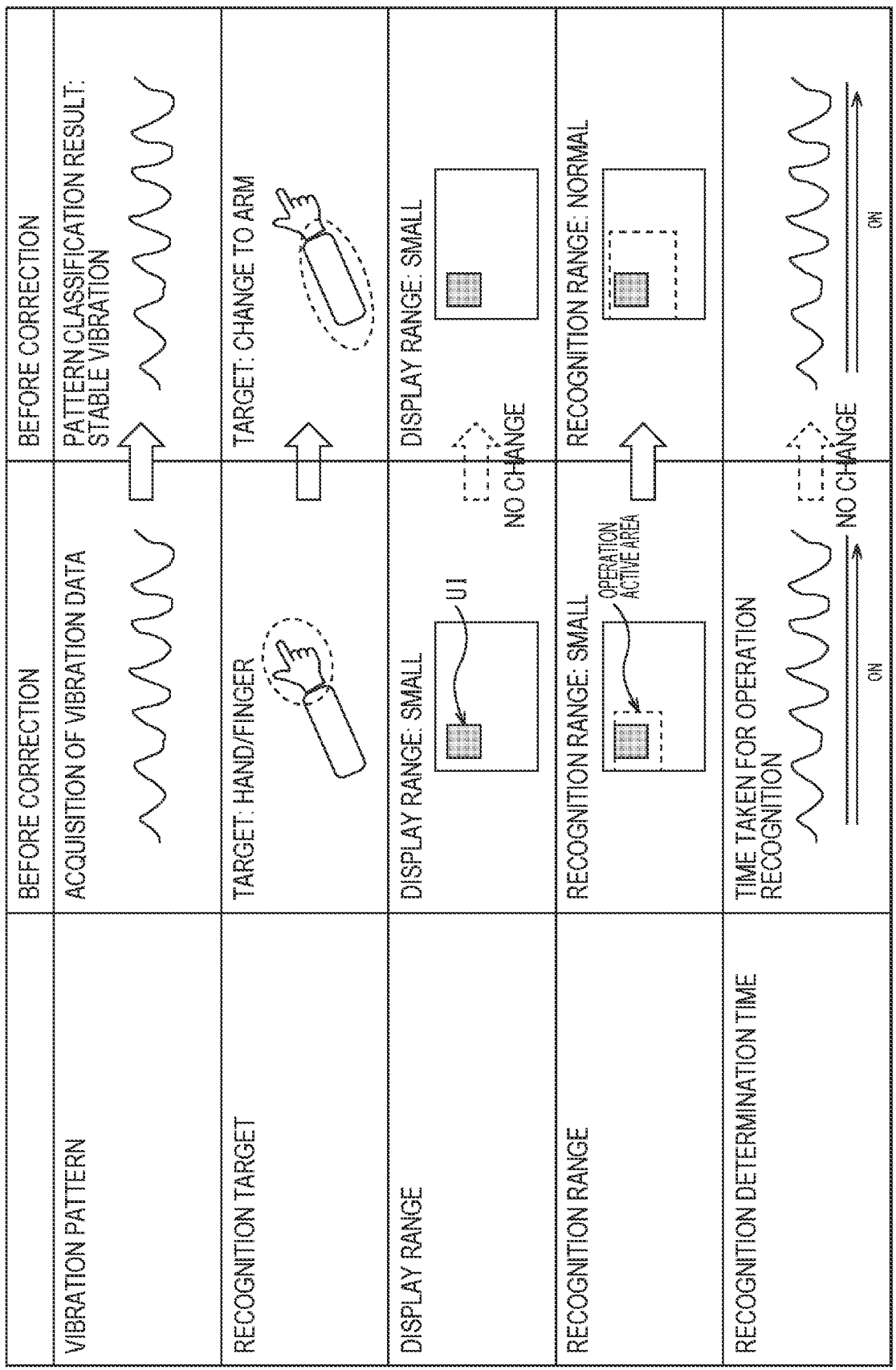
FIG. 11 is a diagram illustrating another example of how to correct the recognition method for recognizing an operation.

FIG. 11 is a diagram illustrating another example of how to correct the recognition method for recognizing an operation.

In the example illustrated in FIG. 11, as illustrated in the first row, the occurrence of stable vibrations occurs at the predicted position is detected by classifying the vibration patterns indicated by the vibration data. For example, in a case where an amplitude larger than the predetermined threshold continuously appears in the vibration data, it is determined that stable vibrations occurs at the predicted position.

In this case, the operation method setting unit 65 generates an operation method parameter indicating that the gesture using the hand and finger of the occupant is not the recognition target, and the gesture using the arm of the occupant is the recognition target. In other words, in a case where the occurrence of stable vibrations at the predicted position is detected, the operation method setting unit 65 restricts the types of gestures usable by the occupant. Therefore, as illustrated in the second row of FIG. 11, in a case where the recognition target is set to the gesture using the hand and finger before the correction of the recognition method for recognizing an operation, the recognition target is changed to the gesture using the arm after the correction of the recognition method for recognizing an operation.

Furthermore, the recognition range setting unit 66 generates a recognition range parameter indicating that the display range of the UI is the small range, and the recognition range is the normal range. Therefore, as illustrated in the third row of FIG. 11, in a case where the display range of the UI is set to the small range before the correction of the recognition method for recognizing an operation, the display range of the UI is not changed even after the correction of the recognition method for recognizing an operation. Furthermore, as illustrated in the fourth row of FIG. 11, in a case where the recognition range is set to the small range before the correction of the recognition method for recognizing an operation, the recognition range is changed to the normal range after the correction of the recognition method for recognizing an operation.

The recognition determination time setting unit 67 generates a recognition determination time parameter that includes the recognition determination time, and indicates that the recognition disabled period is not applied. Therefore, as illustrated in the fifth row of FIG. 11, in a case where the duration of a state in which the occupant points the fingertip or the arm to within the recognition range becomes equal to the recognition determination time before and after the correction of the recognition method for recognizing an operation, it is determined that the operation has been performed.

For example, in a case where the recognition method for recognizing an operation is not corrected, when large vibrations continuously occur, the fingertip or the display device 11B may shake to prevent the fingertip from being accurately pointed to within the recognition range of a predetermined size.

On the other hand, in a case where the recognition method for recognizing an operation is corrected, even if the fingertip shakes due to vibrations in a period in which large vibrations continuously occur, it is possible to accurately recognize, by seamlessly changing the recognition target to the gesture using the arm, the UI that the occupant desires to select on the basis of the direction of the arm that is less susceptible to vibrations.

Furthermore, even if the arm shakes due to vibrations, it is possible to accurately recognize, by extending the recognition range, the UI that the occupant desires to select. Therefore, even if vibrations occurs in the target vehicle 2B, the gesture performed by the occupant can be recognized as the operation intended by the occupant.

As described above, the operation method setting unit 65, the recognition range setting unit 66, and the recognition determination time setting unit 67 set the recognition method for recognizing an operation using a gesture on the basis of the vibration data. The target vehicle 2B can reduce the influence of vibrations on the gesture and maintain the gesture-based operation system by performing the selection of the operation method, the adjustment to the recognition range, and the adjustment to the recognition determination time in combination.

Configuration of UI Display Control Unit>

Figure 12:
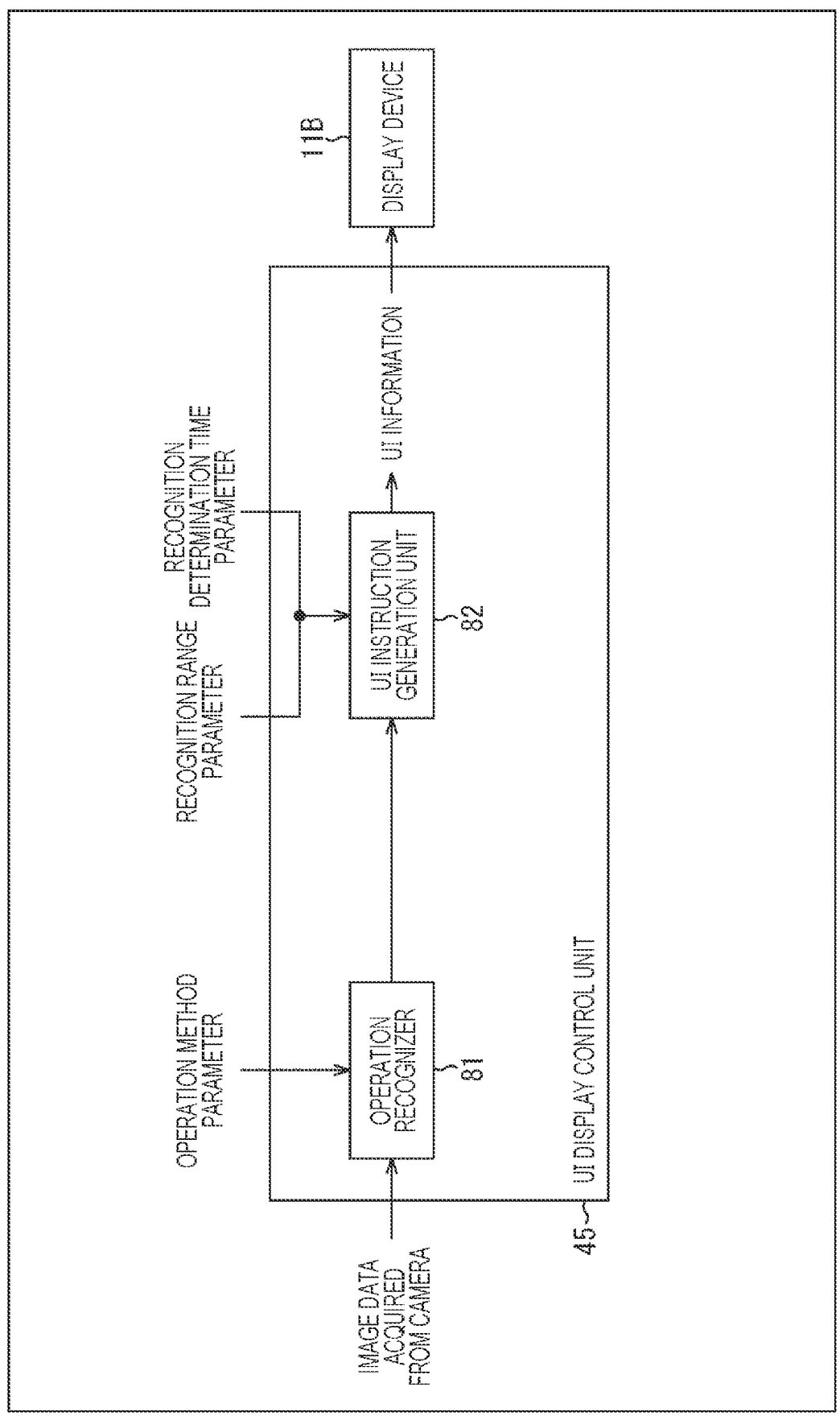
FIG. 12 is a block diagram illustrating a detailed configuration example of a UI display control unit.

FIG. 12 is a block diagram illustrating a detailed configuration example of the UI display control unit 45.

As illustrated in FIG. 12, the UI display control unit 45 includes an operation recognizer 81 and a UI instruction generation unit 82.

The image data acquired from the camera 46 is supplied to the operation recognizer 81, and the operation method parameter is supplied from the vibration pattern analysis unit 42. The operation recognizer 81 recognizes the gesture set as the recognition target by the operation method parameter on the basis of the image data acquired from the camera 46.

Data indicating the result of recognizing the gesture set as the recognition target is supplied to the UI instruction generation unit 82.

The recognition range parameter and the recognition determination time parameter is supplied from the vibration pattern analysis unit 42 to the UI instruction generation unit 82. The UI instruction generation unit 82 recognizes the operation on the basis of the result of recognizing the gesture by the operation recognizer 81 and generates UI information indicating details of the operation.

For example, the UI instruction generation unit 82 determines whether or not the gesture satisfies the operation conditions such as whether or not the duration of the state in which the gesture is performed within the recognition range becomes equal to the recognition determination time. For example, in a case where the gesture satisfies the operation conditions, the UI instruction generation unit 82 determines that the gesture is the operation of selecting the UI corresponding to the recognition range. Note that the recognition range is indicated by the recognition range parameter, and the recognition determination time is indicated by the recognition determination time parameter.

The UI instruction generation unit 82 supplies the UI information to the display device 11B to cause the display device 11B to operate in accordance with the details of the operation.

Note that the following vehicle 2C is provided with the same configuration as the configuration of the target vehicle 2B.

3. Operation of Each Device

How each device of the vibration data management system having the above-described configuration operates will be described.

<How Preceding Vehicle and Server Operate>

Figure 13:
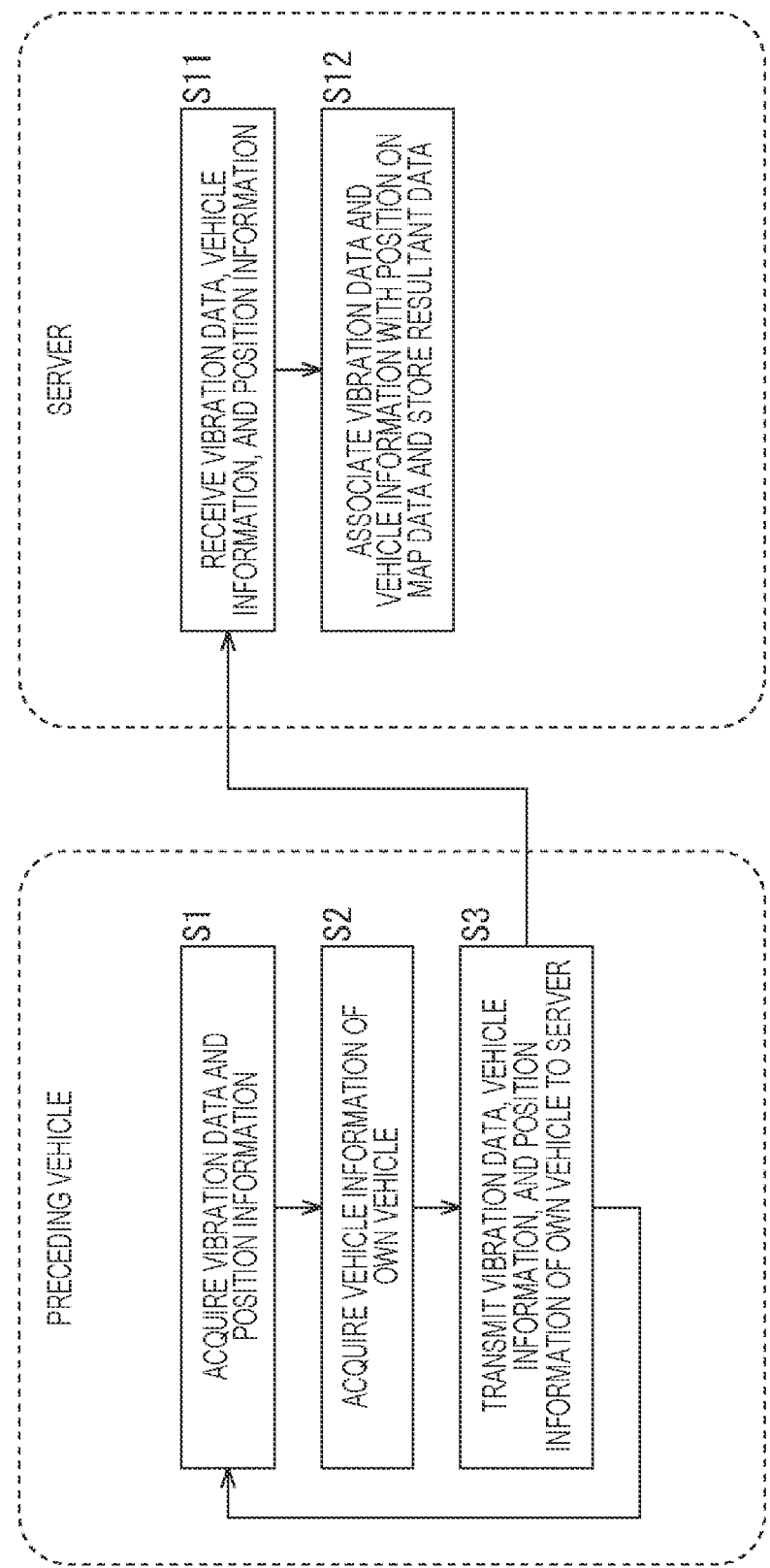
FIG. 13 is a flowchart for describing processing that is performed by the preceding vehicle and the server.

Processing that is performed by the preceding vehicle 2A and the server 1 will be described with reference to a flowchart of FIG. 13.

In step S1, the vibration data acquisition unit 31 of the preceding vehicle 2A acquires vibration data from the acceleration sensor 32, acquires position information from the GNSS receiver 33, and supplies the position information to the data transmission unit 34.

In step S2, the vibration data acquisition unit 31 of the preceding vehicle 2A acquires vehicle information of the own vehicle (preceding vehicle 2A) and supplies the vehicle information to the data transmission unit 34.

In step S3, the data transmission unit 34 of the preceding vehicle 2A transmits the vibration data, the vehicle information, and the position information to the server 1.

After the transmission of the vibration data and the like, in the preceding vehicle 2A, the process of step S1 and the subsequent processes are repeatedly performed.

In step S11, the data reception unit 21 of the server 1 receives the vibration data, the vehicle information, and the position information transmitted from the preceding vehicle 2A, and supplies the vibration data to the vibration data management unit 22.

In step S12, the vibration data management unit 22 of the server 1 stores the vibration data labeled with the vehicle information with the vibration data associated with the position on the map data based on the position information.

In the server 1, every time the vibration data and the like are transmitted from the preceding vehicle 2A, the process of step S11 and the subsequent process are performed.

<How Target Vehicle and Server Operate>

Overall Operation

Processing that is performed by the target vehicle 2B and the server 1 will be described with reference to the flowchart of FIG. 14.

In step S21, the vibration pattern analysis unit 42 of the target vehicle 2B acquires position information of the own vehicle (target vehicle 2B) from the GNSS receiver 44, determines a predicted position, and notifies the data reception unit 41 of the predicted position.

In step S22, the data reception unit 41 of the target vehicle 2B acquires vehicle information of the own vehicle (target vehicle 2B).

In step S23, the data reception unit 41 of the target vehicle 2B requests vibration data acquired at the predicted position from the server 1. Here, vibration data acquired by a vehicle of a vehicle type corresponding to the vehicle type of the target vehicle 2B is requested on the basis of the vehicle information acquired in step S22.

In step S41, the data transmission unit 23 of the server 1 transmits the vibration data associated with the position requested by the target vehicle 2B to the target vehicle 2B. In the server 1, every time vibration data is requested from the target vehicle 2B, the process of step S41 is performed.

In step S24, the data reception unit 41 of the target vehicle 2B receives the vibration data of the predicted position transmitted from the server 1, and supplies the vibration data to the vibration pattern analysis unit 42.

In step S25, the vibration pattern analysis unit 42 of the target vehicle 2B performs a UI correction data generation process. In the UI correction data generation process, UI correction data is generated on the basis of the vibration data acquired from the server 1. Details of the UI correction data generation process will be described later with reference to FIG. 15.

When the target vehicle 2B reaches the predicted position, the UI display control unit 45 of the target vehicle 2B performs an operation determination process in step S26. In the operation determination process, the gesture performed by the occupant is recognized, and the UI information is generated on the basis of the result of recognizing the gesture. At this time, the recognition method for recognizing an operation is corrected as necessary using the UI correction data generated in step S25. Details of the operation determination process will be described later with reference to FIG. 16.

In step S27, the vibration pattern analysis unit 42 of the target vehicle 2B acquires vibration data from the acceleration sensor 43, acquires position information from the GNSS receiver 44, and supplies the position information to the data transmission unit 47.

In step S28, the data transmission unit 47 of the target vehicle 2B transmits the UI correction data, and the vibration data, the vehicle information, and the position information of the own vehicle (target vehicle 2B) to the server 1.

After the UI correction data and the like are transmitted, in the target vehicle 2B, the process of step S21 and the subsequent processes are repeatedly performed.

In step S42, the data reception unit 21 of the server 1 receives the UI correction data, the vibration data, the vehicle information, and the position information transmitted from the target vehicle 2B, and supplies the UI correction data, the vibration data, the vehicle information, and the position information to the vibration data management unit 22.

In step S43, the vibration data management unit 22 of the server 1 stores the vibration data and the UI correction data labeled with the vehicle information with the vibration data and the UI correction data associated with the position on the map data based on the position information.

In the server 1, every time the vibration data and the like are transmitted from the target vehicle 2B, the process of step S42 and the subsequent process are performed.

UI Correction Data Generation Process

The UI correction data generation process performed in step S25 in FIG. 14 will be described with reference to the flowchart of FIG. 15.

In step S51, the vibration pattern analysis unit 42 acquires vibration data from the data reception unit 41.

In step S52, the vibration pattern analysis unit 42 analyzes a vibration pattern on the basis of the vibration data.

Specifically, the vibration amplitude detection unit 61, the vibration frequency detection unit 62, and the vibration occurrence frequency detection unit 63 of the vibration pattern analysis unit 42 generate vibration characteristic data on the basis of the vibration data and supply the vibration characteristic data to the vibration pattern classification unit 64. The vibration pattern classification unit 64 classifies vibration patterns indicated by the vibration data on the basis of the vibration characteristic data and generates vibration classification information. The vibration pattern classification unit 64 supplies the vibration classification information to the operation method setting unit 65, the recognition range setting unit 66, and the recognition determination time setting unit 67.

In step S53, the operation method setting unit 65 sets an operation method on the basis of the vibration classification information. That is, the operation method setting unit 65 sets a gesture to be the recognition target (sets a gesture to be usable). The operation method setting unit 65 generates an operation method parameter used to set the gesture to be the recognition target.

In step S54, the recognition range setting unit 66 sets a recognition range on the basis of the vibration classification information. The recognition range setting unit 66 generates a recognition range parameter used to set the recognition range.

In step S55, the recognition determination time setting unit 67 sets a recognition determination time on the basis of the vibration classification information. Furthermore, the recognition determination time setting unit 67 sets whether or not to apply a recognition disabled period on the basis of the vibration classification information. The recognition determination time setting unit 67 generates a recognition determination time parameter used to set the recognition determination time and whether or not to apply the recognition disabled period.

In step S56, the vibration pattern analysis unit 42 supplies the operation method parameter, the recognition range parameter, and the recognition determination time parameter to the UI display control unit 45 as UI correction data.

In step S57, the vibration pattern analysis unit 42 supplies the UI correction data to the data transmission unit 47.

Figure 14:
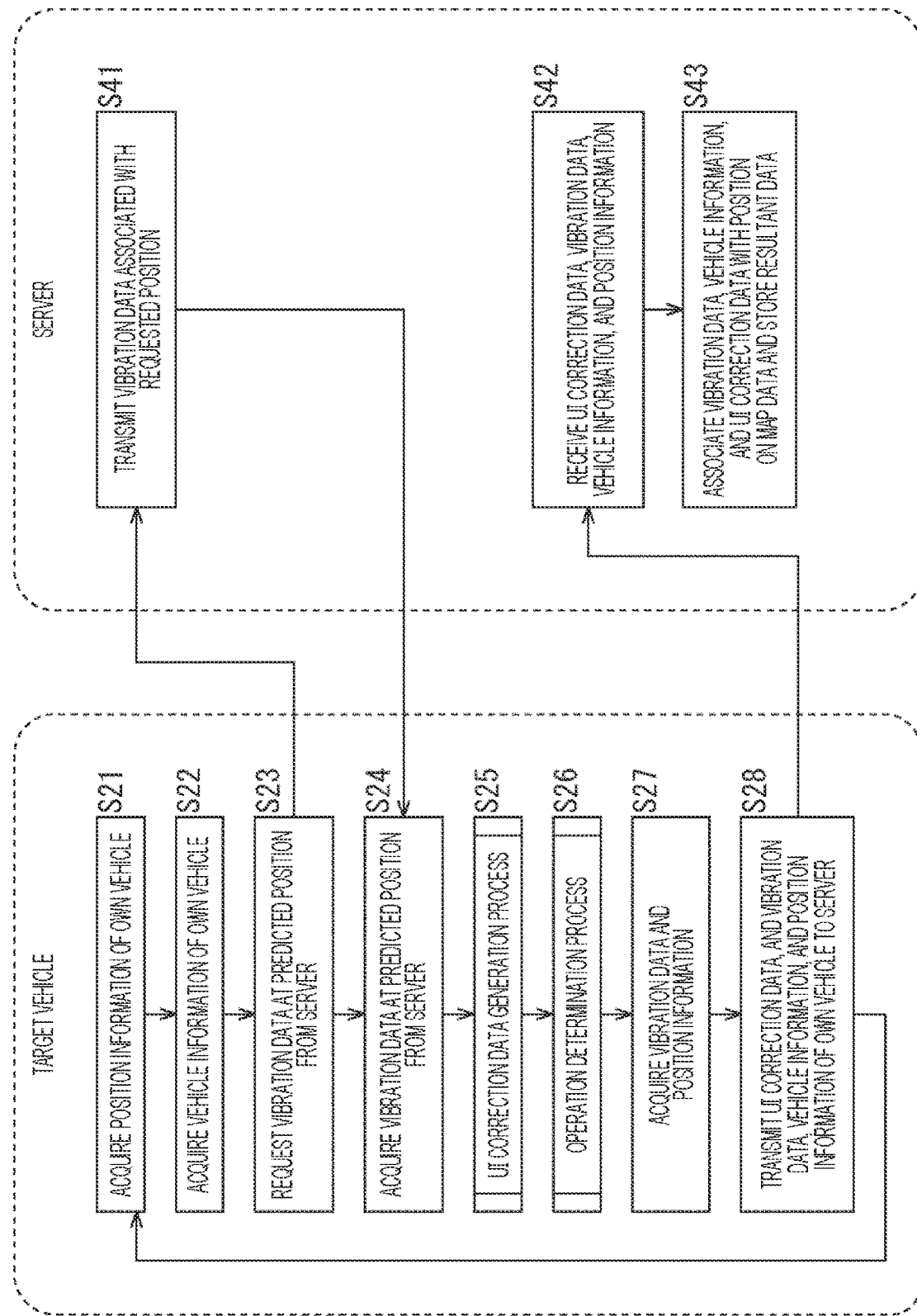
FIG. 14 is a flowchart for describing processing that is performed by the target vehicle and the server.
Figure 15:
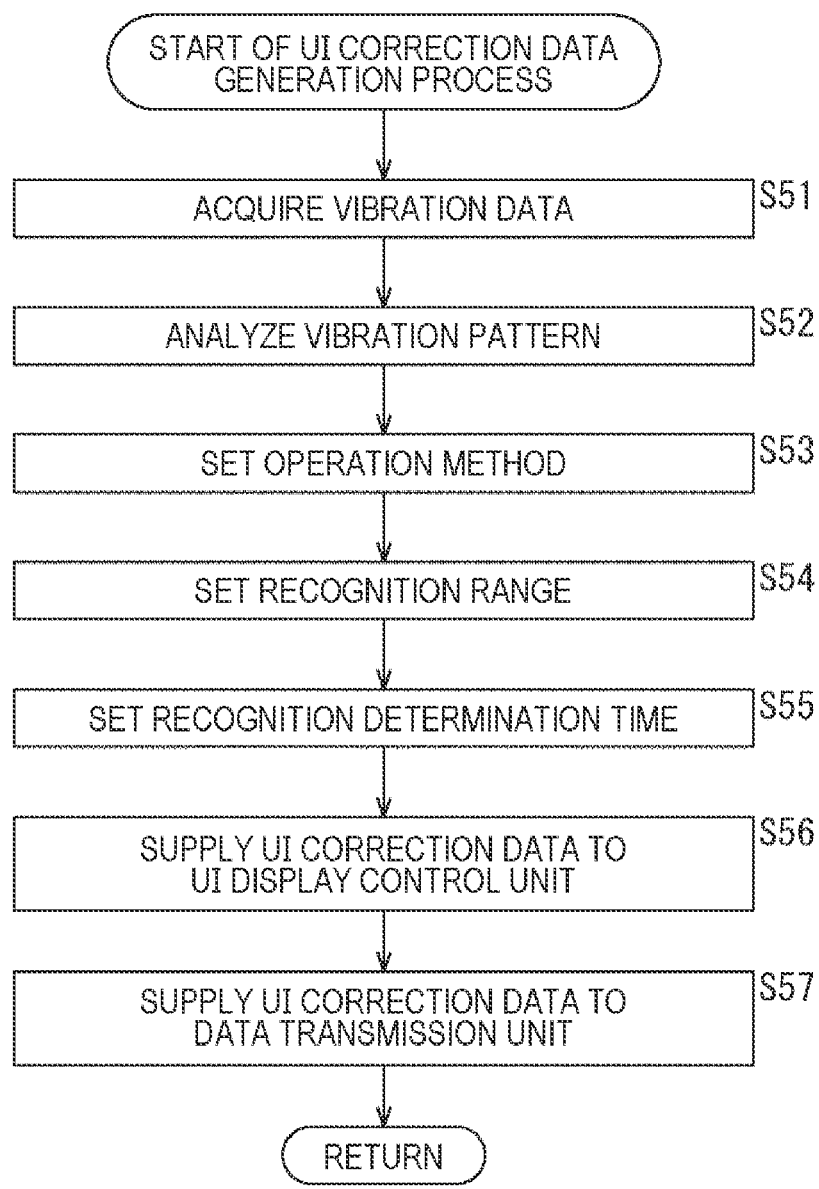
FIG. 15 is a flowchart for describing a UI correction data generation process.

Thereafter, the processing returns to step S25 in FIG. 14, and the subsequent processes are performed.

Operation Determination Process

Figure 16:
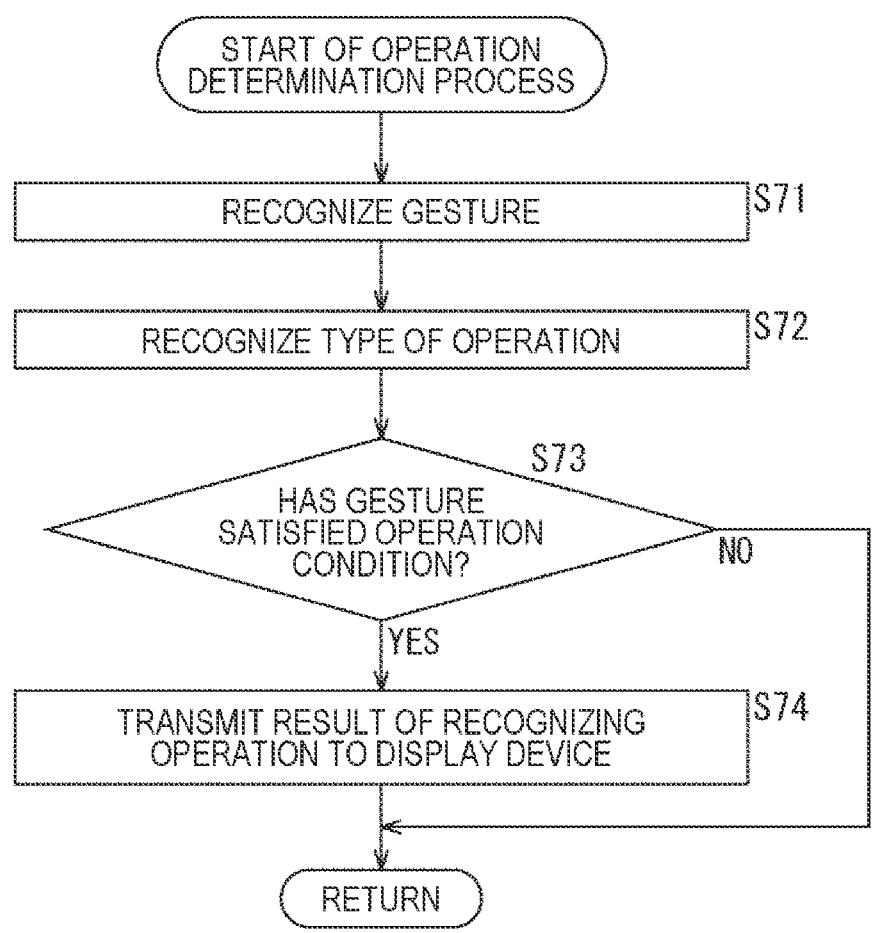
FIG. 16 is a flowchart for describing an operation determination process.

The operation determination process performed in step S26 in FIG. 14 will be described with reference to the flowchart of FIG. 16.

In step S71, the operation recognizer 81 recognizes a gesture. That is, the operation recognizer 81 recognizes, on the basis of, for example, image data, the gesture using the part set as the recognition target in the operation method parameter. For example, the operation recognizer 81 recognizes a gesture using the hand of the occupant.

In step S72, the UI instruction generation unit 82 recognizes the operation type on the basis of, for example, the gesture recognized by the operation recognizer 81. For example, in a case where the operation recognizer 81 recognizes that a gesture of pointing the fingertip of the hand to the display device 11B is performed, the UI instruction generation unit 82 recognizes that an operation for selecting the UI displayed on the display device 11B is performed.

In step S73, the UI instruction generation unit 82 determines whether or not the gesture performed by the occupant satisfies the operation conditions. For example, the UI instruction generation unit 82 compares the recognition determination time with the duration of the state in which the part used for the gesture set as the recognition target is pointed to within the recognition range. In a case where the duration of the gesture becomes equal to the recognition determination time, the UI instruction generation unit 82 determines that the gesture satisfies the operation conditions, and the processing proceeds to step S74. At this time, in a case where the application of the recognition disabled period is set enabled, the duration of the gesture is measured in a period excluding the recognition disabled period. Note that the recognition range is indicated by the recognition range parameter, and the recognition determination time and whether or not to apply the recognition disabled period are indicated by the recognition determination time parameter.

In step S74, the UI instruction generation unit 82 transmits the result of recognizing the operation to the display device 11B. That is, the UI instruction generation unit 82 generates UI information indicating the details of the recognized operation and transmits the UI information to the display device 11B.

Thereafter, the processing returns to step S26 in FIG. 14, and the subsequent processes are performed.

On the other hand, in a case where it is determined in step S73 that the gesture performed by the occupant does not satisfy the operation conditions, the process of step S74 is skipped, the processing returns to step S26 in FIG. 14, and the subsequent processes are performed.

As described above, the target vehicle 2B can properly recognize, even if vibrations occur during traveling, an operation using a gesture performed by the occupant.

4. Modification Example

<Example of Feedback of Validity of UI Correction Data>

For example, since the road condition, a state such as the posture of the occupant, the state of the vehicle, and the like change with situation or time, the correction of the recognition method for recognizing an operation using the UI correction data is not necessarily most suitable. On the other hand, when whether or not the UI correction data is valid is calculated as a success rate of operation recognition (UI operation), and operation recognition with a low success rate is performed again, the UI correction data may be corrected for optimization.

Figure 17:
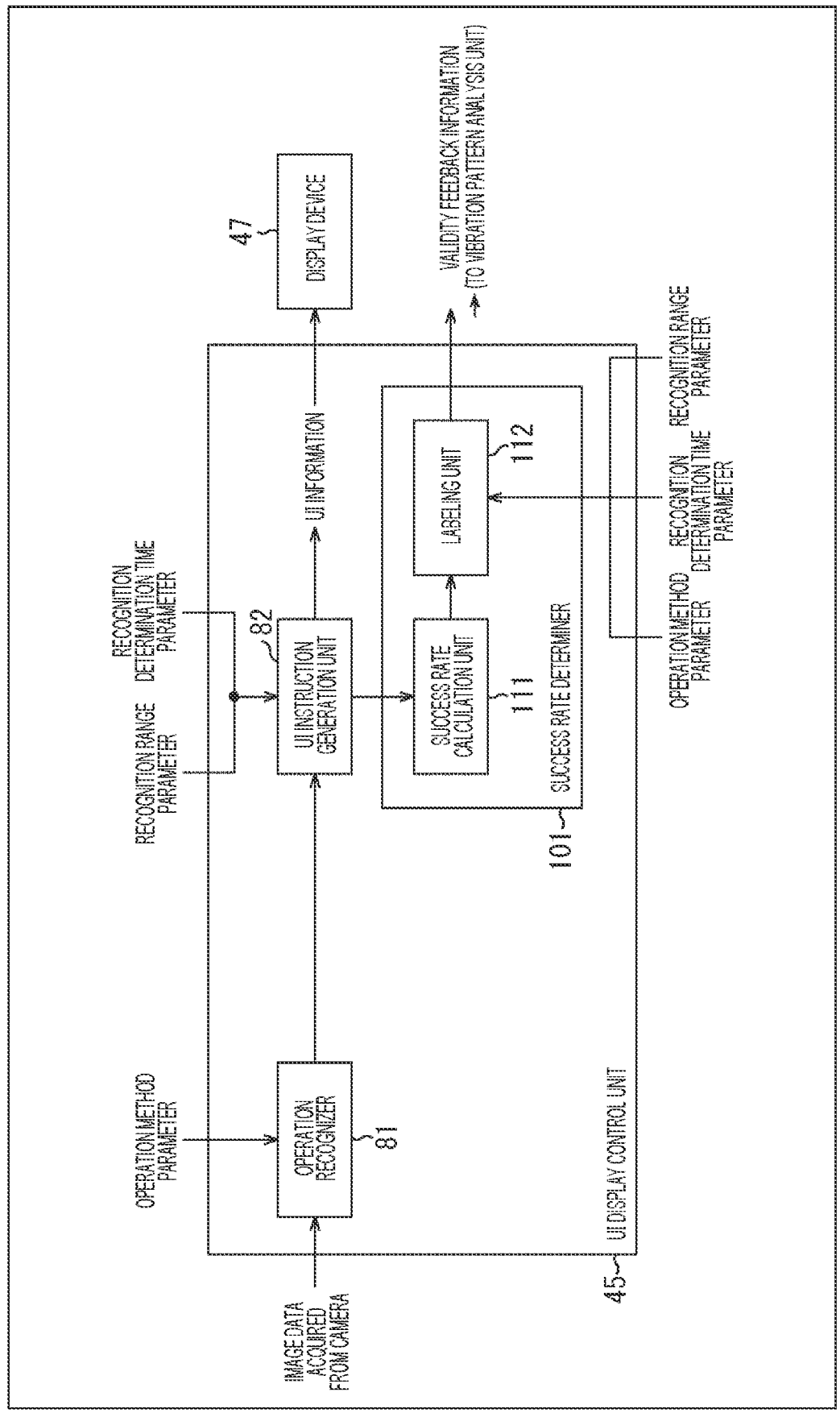
FIG. 17 is a block diagram illustrating another configuration example of the UI display control unit.

FIG. 17 is a block diagram illustrating another configuration example of the UI display control unit 45 in FIG. 7. In FIG. 17, the same configurations as the configurations in FIG. 12 are denoted by the same reference signs. Redundant description will be omitted as appropriate.

The configuration of the UI display control unit 45 illustrated in FIG. 17 is different from the configuration of the UI display control unit 45 in FIG. 12 in that a success rate determiner 101 is provided at the subsequent stage of the UI instruction generation unit 82.

The success rate determiner 101 includes a success rate calculation unit 111 and a labeling unit 112.

The result of determination performed by the UI instruction generation unit 82 is supplied to the success rate calculation unit 111. The success rate calculation unit 111 calculates a success rate of the operation recognition on the basis of the result of determination performed by the UI instruction generation unit 82. For example, the success rate calculation unit 111 calculates the success rate with a case where the UI instruction generation unit 82 determines that the gesture satisfies the operation conditions regarded as success and with a case where the UI instruction generation unit 82 determines that the gesture does not satisfy the operation conditions regarded as failure.

The success rate calculation unit 111 supplies information indicating the calculated success rate to the labeling unit 112.

The UI correction data (the operation method parameter, the recognition range parameter, the recognition determination time parameter) is supplied from the vibration pattern analysis unit 42 to the labeling unit 112. The labeling unit 112 labels the UI correction data with the information supplied from the success rate calculation unit 111 as validity feedback information indicating the validity of the UI correction data.

The labeling unit 112 supplies the validity feedback information to the vibration pattern analysis unit 24, and supplies the UI correction data labeled with the validity feedback information to the data transmission unit 47.

Figure 18:
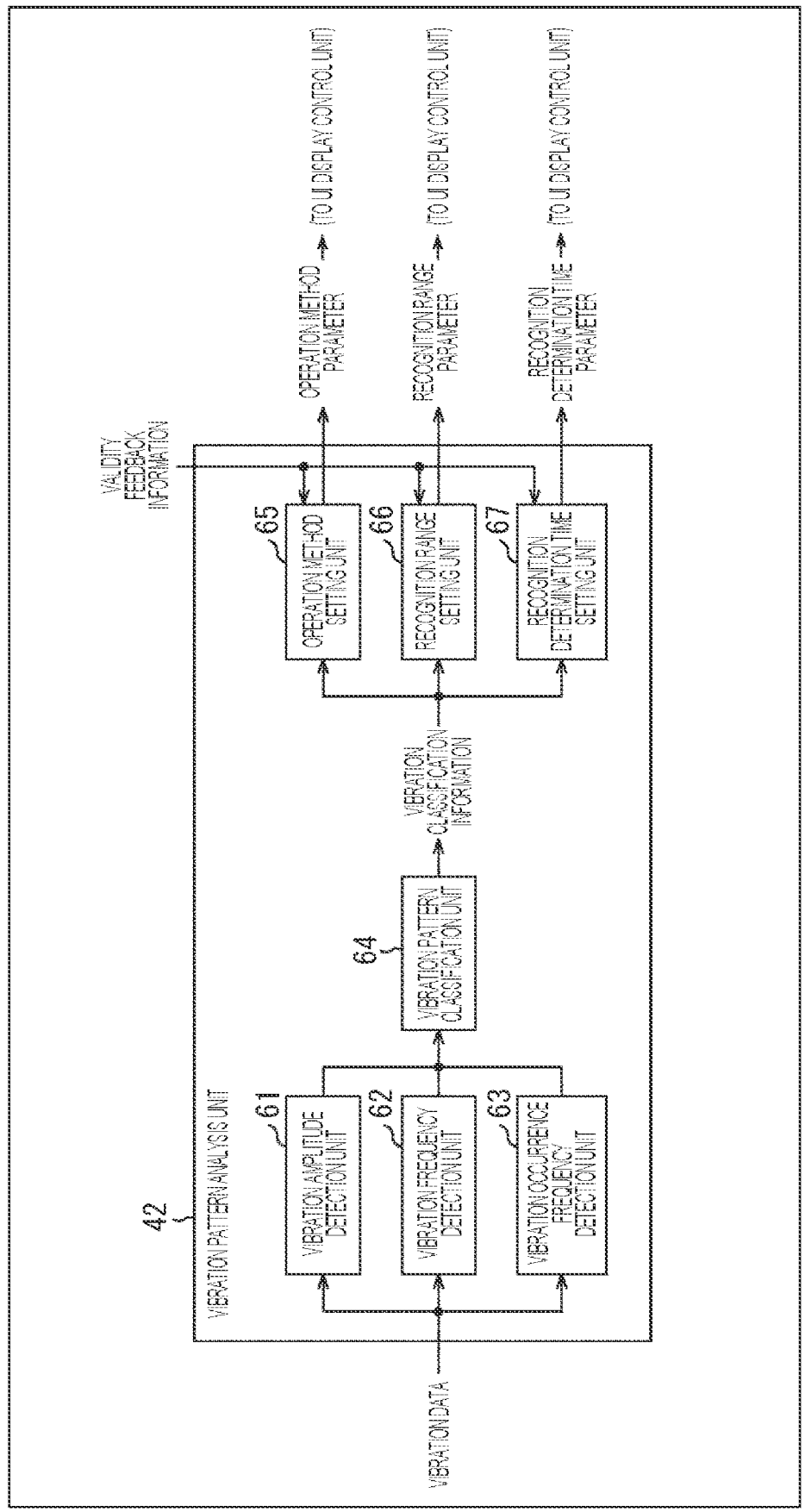
FIG. 18 is a block diagram illustrating another configuration example of the vibration pattern analysis unit.

FIG. 18 is a block diagram illustrating another configuration example of the vibration pattern analysis unit 42 in FIG. 7. In FIG. 18, the same configurations as the configurations in FIG. 8 are denoted by the same reference signs. Redundant description will be omitted as appropriate.

The configuration of the vibration pattern analysis unit 42 illustrated in FIG. 18 is different from the configuration of the vibration pattern analysis unit 42 in FIG. 8 in that the validity feedback information is supplied from the UI display control unit 45 to the operation method setting unit 65, the recognition range setting unit 66, and the recognition determination time setting unit 67.

The operation method setting unit 65 corrects the operation method parameter so as to disable an operation method with a low success rate on the basis of the validity feedback information. For example, the operation method setting unit 65 corrects the operation method parameter so as to disable a gesture using a part susceptible to vibrations such as a hand or a finger (to make the gesture not subject to recognition).

The recognition range setting unit 66 corrects the recognition range parameter so as to optimize the recognition range or the display range for an operation with a low success rate on the basis of the validity feedback information. For example, the recognition range setting unit 66 corrects the recognition range parameter so as to extend the recognition range or the display range.

The recognition determination time setting unit 67 corrects, on the basis of the validity feedback information, the recognition determination time parameter so as to optimize the recognition determination time for the operation with a low success rate. For example, the recognition determination time setting unit 67 corrects the recognition determination time parameter so as to shorten the recognition determination time.

Figure 19:
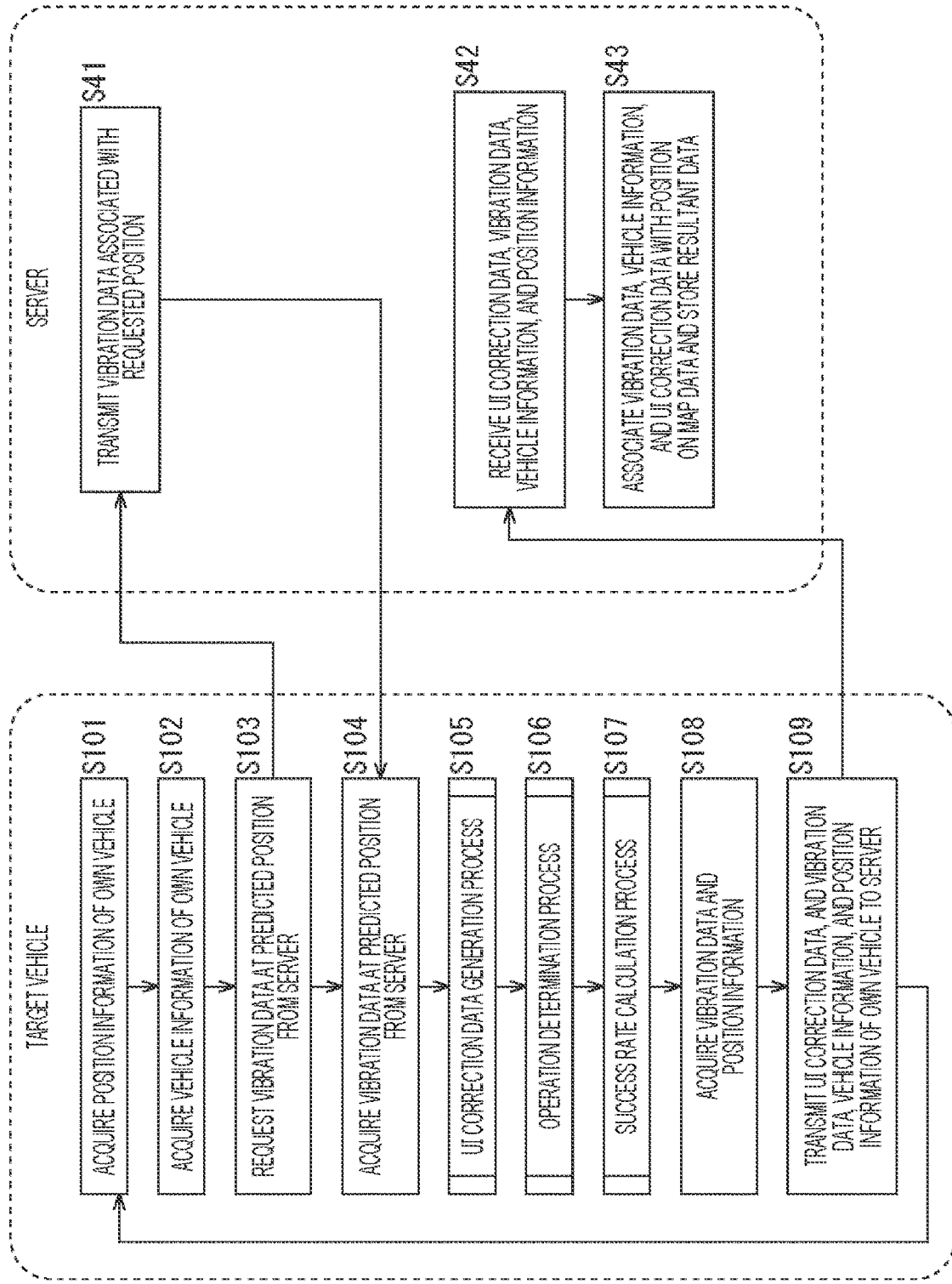
FIG. 19 is a flowchart for describing processing that is performed by the target vehicle and the server.

Processing performed by the target vehicle 2B and the server 1 having the above-described configuration will be described with reference to a flowchart of FIG. 19. The processing performed by the server 1 is the same as the processing performed by the server 1 in FIG. 14, so that the description of the processing will be omitted.

In steps S101 to S106, processes similar to the processes of steps S21 to 26 in FIG. 14 are performed. That is, the vibration data of the predicted position is acquired from the server 1, and the UI correction data is generated. Furthermore, the UI information indicating the details of the operation corresponding to the gesture performed by the occupant is generated and transmitted to the display device 11B.

In step S107, the success rate determiner 101 of the target vehicle 2B performs the success rate calculation process. In the success rate calculation process, the UI correction data is labeled with the validity feedback information, and the validity of the UI correction data is fed back to the UI correction data generation process. The success rate calculation process will be described later with reference to FIG. 20.

In step S108, the vibration pattern analysis unit 42 of the target vehicle 2B acquires vibration data from the acceleration sensor 43, acquires position information from the GNSS receiver 44, and supplies the position information to the data transmission unit 47.

In step S109, the data transmission unit 47 of the target vehicle 2B transmits, to the server 1, the UI correction data labeled with the validity feedback information, and the vibration data, the vehicle information, and the position information of the own vehicle.

After the UI correction data and the like are transmitted, the process of step S101 and the subsequent processes are repeatedly performed. In the UI correction data generation process of step S105 that is repeatedly performed, the UI correction data corrected on the basis of the validity feedback information is generated.

Figure 20:
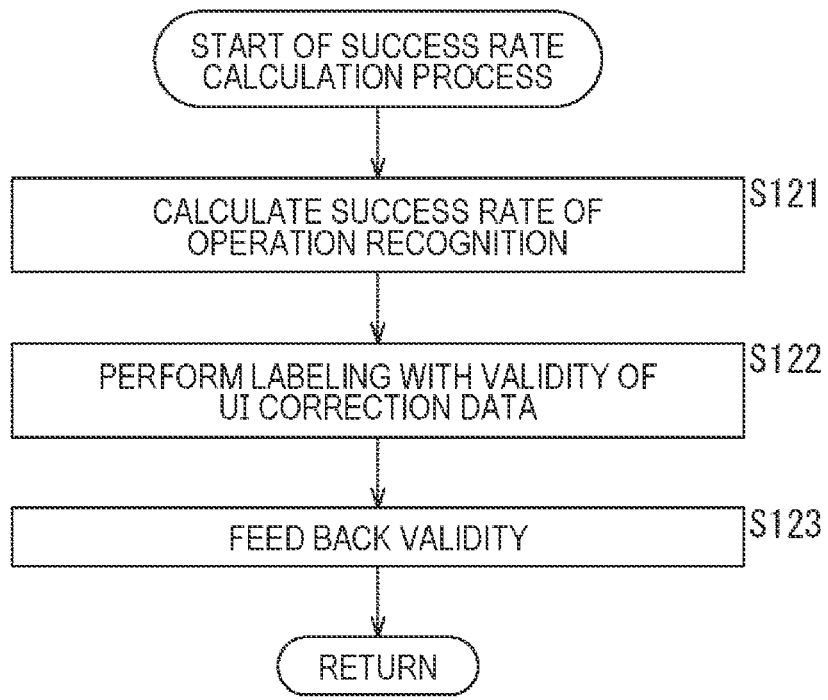
FIG. 20 is a flowchart for describing a success rate calculation process.

The success rate calculation process performed in step S107 in FIG. 19 will be described with reference to a flowchart of FIG. 20.

In step S121, the success rate calculation unit 111 calculates a success rate of operation recognition and supplies information indicating the result of calculating the success rate to the labeling unit 112.

In step S122, the labeling unit 112 labels the UI correction data with the information supplied from the success rate calculation unit 111 as the validity feedback information indicating the validity of the UI correction data. The labeling unit 112 supplies the UI correction data labeled with the validity feedback information to the data transmission unit 47.

In step S123, the labeling unit 112 feeds back the validity feedback information to the vibration pattern analysis unit 42. Thereafter, the processing returns to step S107 in FIG. 19, and the subsequent processes are performed.

As described above, the introduction of the mechanism in which the validity of the UI correction data is fed back makes it possible to continuously set the UI correction data that allows a reduction in the influence of the vibrations generated in the target vehicle 2B, regardless of the road condition, a state such as the posture of the occupant, the state of the vehicle, and the like. Furthermore, as the frequency of use increases, such as performing the same gesture, the accuracy of operation recognition can be improved.

Using the UI correction data generated by the target vehicle 2B and labeled with the validity feedback information, the following vehicle 2C can set the recognition method for recognizing an operation with the road condition and the like taken into consideration. It is therefore possible to perform further optimum operation recognition. Furthermore, as the frequency of use increases, such as passing through the same road, the accuracy of operation recognition can be improved.

<Others>

Although the example where the vibration data of the predicted position labeled with the vehicle information is acquired from the server 1 has been described, a configuration where the target vehicle 2B communicates with the preceding vehicle 2A to acquire the vibration data, the position information, and the vehicle information directly from the preceding vehicle 2A is possible. A configuration where the target vehicle 2B communicates with the following vehicle 2C to transmit the vibration data, the position information, the vehicle information, and the UI correction data to the following vehicle 2C is also possible.

Furthermore, a configuration where the target vehicle 2B acquires the vibration data of the predicted position on the basis of a moving image captured of the preceding vehicle 2A. The moving image captured of the preceding vehicle 2A is acquired, for example, by being captured by a front camera mounted on the target vehicle 2B.

Although the example where the UI and the video content are displayed on the display device has been described, the UI and the video content may be projected onto the interior of the vehicle by a high-luminance projector, for example.

For example, in a case where the vibration data acquired by the preceding vehicle 2A of the vehicle type corresponding to the vehicle type of the target vehicle 2B is not stored in the server 1, the vibration data acquired by the preceding vehicle 2A of the vehicle type different from the vehicle type of the target vehicle 2B may be corrected in accordance with the vehicle type of the target vehicle 2B. Such correction is performed by, for example, the signal processing device of the target vehicle 2B or the server 1.

Although the example where the vibrations of the vehicle 2 are detected by the acceleration sensor has been described, the vibrations of the vehicle 2 may be detected by another vibration detection unit.

For example, each vehicle 2 may transmit, to the server 1, occupant information indicating a characteristic such as the physique of the occupant, and the server 1 may store the occupant information received from each vehicle 2 with the occupant information associated with the UI correction data. Then, each vehicle 2 may transmit, to the server 1, an occupant space indicating the characteristic of the occupant, and the server 1 may transmit, to each vehicle 2, UI correction data associated with occupant information similar to the occupant information received from each vehicle 2. As a result, each vehicle 2 can correct the recognition method for recognizing an operation on the basis of the UI correction data indicating the recognition method for recognizing an operation set for the occupant having a similar characteristic.

The present technology is further applicable to, for example, a case where a gesture-based operation performed by an occupant is recognized in a mobile body other than a vehicle.

<Computer Configuration Example>

The processing performed by the server 1 and the signal processing device described above can be performed by hardware or software. In a case where the series of processes are performed by software, a program constituting the software is installed from a program recording medium onto a computer incorporated in dedicated hardware, a general purpose personal computer, or the like.

Figure 21:
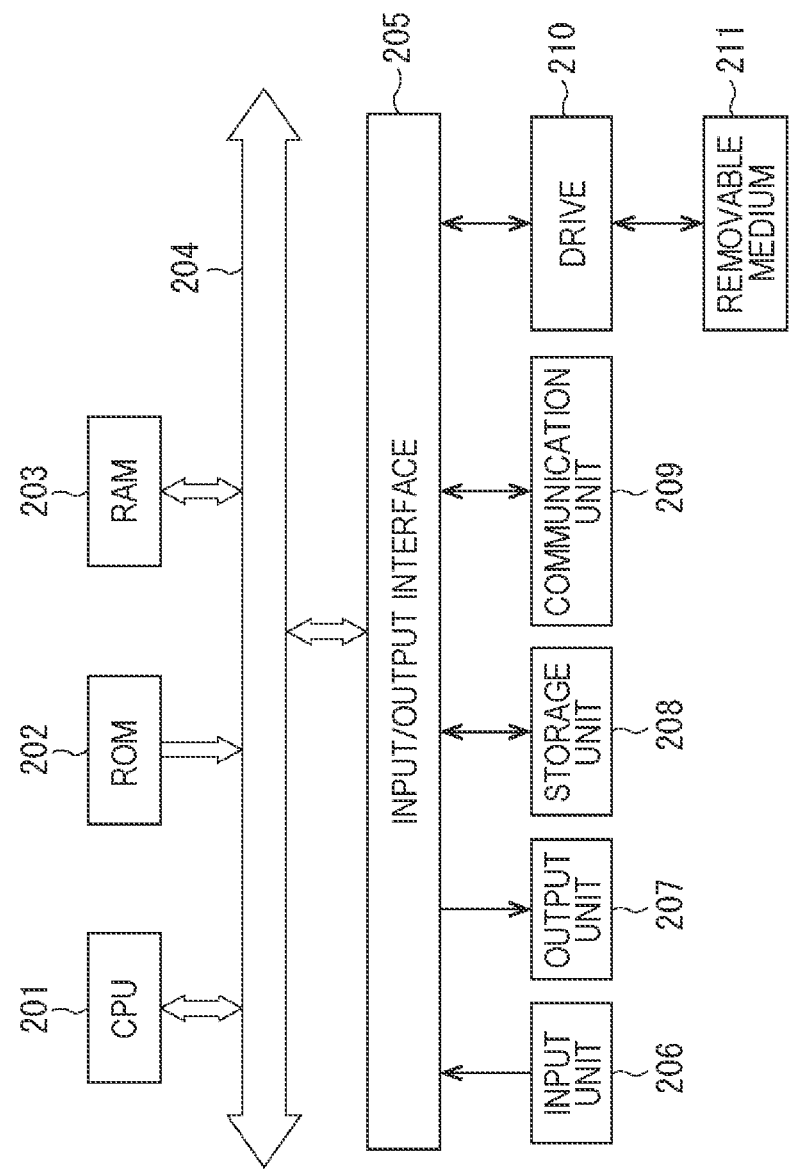
FIG. 21 is a block diagram illustrating a configuration example of hardware of a computer.

FIG. 21 is a block diagram illustrating a configuration example of the hardware of the computer that performs the above-described series of processes in accordance with the program.

A central processing unit (CPU) 201, a read only memory (ROM) 202, and a random access memory (RAM) 203 are mutually connected by a bus 204.

An input/output interface 205 is further connected to the bus 204. An input unit 206 including a keyboard, a mouse, and the like, and an output unit 207 including a display, a speaker, and the like are connected to the input/output interface 205. Furthermore, a storage unit 208 including a hard disk, a non-volatile memory, or the like, a communication unit 209 including a network interface or the like, and a drive 210 that drives a removable medium 211 are connected to the input/output interface 205.

In the computer configured as described above, the CPU 201 loads the program stored in the storage unit 208 on the RAM 203 through the input/output interface 205 and the bus 204 and execute the program to perform the above-described series of processes, for example.

The program executed by the CPU 201 is provided, for example, by being recorded in the removable medium 211 or via a wired or wireless transmission medium such as a local area network, the Internet, or digital broadcasting, and is installed on the storage unit 208.

Note that the program executed by the computer may be a program by which processes are performed in time series in the order described herein, or may be a program by which processes are performed in parallel or at necessary timing such as when a call is made or the like.

Note that, herein, a system means a set of a plurality of components (such as devices and modules (parts)), and it does not matter whether or not all the components are in the same housing. Therefore, a plurality of devices housed in separate housings and connected via a network, and one device in which a plurality of modules is housed in one housing are both systems.

Note that, the effects described herein are merely examples and are not limited, and there may be other effects.

The embodiment of the present technology is not limited to the above-described embodiment, and various modifications may be made without departing from the spirit of the present technology.

For example, the present technology may be configured as cloud computing in which one function is shared by a plurality of devices via a network, and the plurality of devices jointly performs processing.

Furthermore, each step described in the above-described flowcharts can be performed by one device or performed by a plurality of devices in a shared manner.

Moreover, in a case where one step includes a plurality of processes, the plurality of processes included in the one step can be performed by one device or performed by a plurality of devices in a shared manner.

<Combination Example of Configurations>

The present technology may also have the following configurations.

(1)

A signal processing device including:
- a setting unit configured to set a recognition method for recognizing an operation using a gesture on the basis of first vibration data indicating vibrations predicted to occur in the future; and
- an operation recognition unit configured to recognize the operation indicated by the gesture performed by a user in accordance with the recognition method set by the setting unit.

(2)

The signal processing device according to the above (1), in which
- the operation recognition unit recognizes the operation indicated by the gesture performed by the user in a vehicle equipped with the signal processing device.

(3)

The signal processing device according to the above (2), in which
- the first vibration data indicates vibrations detected by a preceding vehicle that has traveled ahead of the vehicle through a predicted position where the vehicle is predicted to travel in the future.

(4)

The signal processing device according to the above (3), in which
- the setting unit corrects the recognition method on the basis of correction data indicating the recognition method set for the preceding vehicle.

(5)

The signal processing device according to the above (3) or (4), in which
- the setting unit sets the recognition method on the basis of the first vibration data indicating the vibrations detected by the preceding vehicle of a vehicle type corresponding to a vehicle type of the vehicle.

(6)

The signal processing device according to any one of the above (3) to (5), further including:
- a vibration detection unit configured to detect vibrations of the vehicle and generate second vibration data indicating a result of detecting the vibrations of the vehicle; and
- a transmission unit configured to transmit the second vibration data to a following vehicle that travels through the predicted position behind the vehicle or a server that transmits the second vibration data to the following vehicle.

(7)

The signal processing device according to the above (6), in which
- the transmission unit transmits vehicle information indicating a type of the vehicle to the following vehicle or the server together with the second vibration data.

(8)

The signal processing device according to the above (6) or (7), in which
- the transmission unit transmits correction data indicating the recognition method set by the setting unit to the following vehicle or the server together with the second vibration data.

(9)

The signal processing device according to any one of the above (3) to (8), further including an acquisition unit configured to acquire the first vibration data on the basis of a moving image captured of the preceding vehicle.

(10)

The signal processing device according to any one of the above (1) to (9), in which
- the setting unit sets, as the recognition method, at least one of a type of the gesture to be a recognition target, a range in which the gesture is recognized as the operation, or a recognition determination time taken for the gesture to be recognized as the operation.

(11)

The signal processing device according to the above (10), in which
- the setting unit sets the recognition method on the basis of at least one of randomness, frequency, amplitude, or continuity of the vibrations predicted to occur in the future.

(12)

The signal processing device according to the above (11), in which
- the operation recognition unit recognizes the operation by comparing duration of the gesture in a period excluding a period in which vibrations with an amplitude larger than a predetermined threshold occur with the recognition determination time.

(13)

The signal processing device according to the above (11) or (12), in which
the setting unit restricts the types of the gesture to be the recognition target in a case where vibrations with an amplitude larger than a predetermined threshold are predicted to continuously occur.

(14)

The signal processing device according to any one of the above (11) to (13), in which
the setting unit extends the range in which the gesture is recognized as the operation in a case where vibrations with an amplitude larger than a predetermined threshold are predicted to continuously occur.

(15)

The signal processing device according to any one of the above (1) to (14), in which
the operation recognition unit recognizes the gesture performed by the user on the basis of a moving image captured of the user.

(16)

The signal processing device according to any one of the above (1) to (15), further including a determination unit configured to determine validity of the recognition method set by the setting unit, in which
the setting unit corrects the recognition method on the basis of a result of determining the validity of the recognition method.

(17)

A signal processing method including causing a signal processing device to perform:
setting a recognition method for recognizing an operation using a gesture on the basis of first vibration data indicating vibrations predicted to occur in the future; and
recognizing the operation indicated by the gesture performed by a user in accordance with the set recognition method.

(18)

A computer-readable recording medium storing a program for performing a process, the process including:
setting a recognition method for recognizing an operation using a gesture on the basis of first vibration data indicating vibrations predicted to occur in the future; and
recognizing the operation indicated by the gesture performed by a user in accordance with the set recognition method.

(19)

A signal processing system including:
a signal processing device including:
a setting unit configured to set a recognition method for recognizing an operation using a gesture on the basis of vibration data indicating vibrations predicted to occur in the future; and
an operation recognition unit configured to recognize the operation indicated by the gesture performed by a user in accordance with the recognition method set by the setting unit; and
a display device including a display unit configured to display an image on which the operation using the gesture is performed.

(20)

The signal processing system according to the above (19), further including a server, the server including a management unit configured to manage the vibration data with the vibration data associated with a position where the vibrations indicated by the vibration data are detected, in which
the setting unit sets the recognition method on the basis of the vibration data acquired from the server.

REFERENCE SIGNS LIST

1 Server
2A Preceding vehicle
2B Target vehicle
2C Following vehicle
11A to 11C Display device
21 Data reception unit
22 Vibration data management unit
23 Data transmission unit
31 Vibration data acquisition unit
32 Acceleration sensor
33 GNSS receiver
34 Data transmission unit
41 Data reception unit
42 Vibration pattern analysis unit
43 Acceleration sensor
44 GNSS receiver
45 UI display control unit
46 Camera
47 Data transmission unit
61 Vibration amplitude detection unit
62 Vibration frequency detection unit
63 Vibration occurrence frequency detection unit
64 Vibration pattern classification unit
65 Operation method setting unit
66 Recognition range setting unit
67 Recognition determination time setting unit
81 Operation recognizer
82 UI instruction generation unit
101 Success rate determiner
111 Success rate calculation unit
112 Labeling unit

The invention claimed is:

1. A signal processing device, comprising:
a setting unit configured to set, based on first vibration data, a recognition method to recognize an operation using a gesture of a user, wherein
the user is in a first vehicle equipped with the signal processing device,
the first vibration data indicates vibrations predicted to occur in the first vehicle in the future,
the first vibration data further indicates the vibrations detected by a second vehicle that has travelled ahead of the first vehicle, through a predicted position where the first vehicle is predicted to travel in the future, and
a vehicle type of the second vehicle corresponds to a vehicle type of the first vehicle; and
an operation recognition unit configured to recognize, based on the set recognition method, the operation indicated by the gesture of the user.

2. The signal processing device according to claim 1, wherein
the setting unit is further configured to correct the recognition method based on correction data, and
the correction data indicates a specific recognition method set for the second vehicle.

3. The signal processing device according to claim 1, further comprising:
a vibration detection unit configured to:
detect vibrations of the first vehicle; and
generate second vibration data indicating a result of the detection of the vibrations of the first vehicle; and
a transmission unit configured to transmit the generated second vibration data to at least one of
a third vehicle that travels through the predicted position behind the first vehicle, or
a server that transmits the second vibration data to the third vehicle.

4. The signal processing device according to claim 3, wherein the transmission unit is further configured to transmit, together with the second vibration data, vehicle information indicating the vehicle type of the first vehicle to at least one of
the third vehicle, or
the server.

5. The signal processing device according to claim 3, wherein the transmission unit is further configured to transmit, together with the second vibration data, correction data indicating the recognition method set by the setting unit to
the third vehicle, or
the server.

6. The signal processing device according to claim 1, further comprising
an acquisition unit configured to acquire the first vibration data based on a moving image captured of the second vehicle.

7. The signal processing device according to claim 1, wherein
the setting unit is further configured to set, as the recognition method, at least one of
a type of the gesture to be a recognition target,
a range in which the gesture is recognized as the operation, or
a recognition determination time taken for the gesture to be recognized as the operation.

8. The signal processing device according to claim 7, wherein the setting unit is further configured to set the recognition method based on at least one of
randomness of the vibrations predicted to occur in the future,
a frequency of the vibrations predicted to occur in the future,
an amplitude of the vibrations predicted to occur in the future, or
continuity of the vibrations predicted to occur in the future.

9. The signal processing device according to claim 8, wherein
the operation recognition unit is further configured to recognize the operation by comparison of a duration of the gesture in a period with the recognition determination time, and
the period excludes a period in which vibrations with an amplitude larger than a specific threshold occur.

10. The signal processing device according to claim 8, wherein
the setting unit is further configured to restrict the type of the gesture to be the recognition target in a case where vibrations with an amplitude larger than a specific threshold are predicted to continuously occur.

11. The signal processing device according to claim 8, wherein
the setting unit is further configured to extend the range in which the gesture is recognized as the operation in a case where vibrations with an amplitude larger than a specific threshold are predicted to continuously occur.

12. The signal processing device according to claim 1, wherein
the operation recognition unit is further configured to recognize the gesture of the user based on a moving image captured of the user.

13. The signal processing device according to claim 1, further comprising:
a determination unit configured to determine validity of the recognition method set by the setting unit, wherein
the setting unit is further configured to corrects the recognition method based on a result of the determination of the validity of the recognition method.

14. A signal processing method, comprising:
causing a signal processing device to perform:
setting, based on vibration data, a recognition method for recognizing an operation using a gesture of a user, wherein
the user is in a first vehicle equipped with the signal processing device,
the vibration data indicates vibrations predicted to occur in the first vehicle in the future,
the vibration data further indicates the vibrations detected by a second vehicle that has travelled ahead of the first vehicle, through a predicted position where the first vehicle is predicted to travel in the future, and
a vehicle type of the second vehicle corresponds to a vehicle type of the first vehicle; and
recognizing, based on the set recognition method, the operation indicated by the gesture of the user.

15. A non-transitory computer-readable medium having stored thereon, computer-executable instructions which, when executed by a computer of a signal processing device, cause the computer to execute operations, the operations comprising:
setting, based on vibration data, a recognition method for recognizing an operation using a gesture of a user, wherein
the user is in a first vehicle equipped with the signal processing device,
the vibration data indicates vibrations predicted to occur in the first vehicle in the future,
the vibration data further indicates the vibrations detected by a second vehicle that has travelled ahead of the first vehicle, through a predicted position where the first vehicle is predicted to travel in the future, and
a vehicle type of the second vehicle corresponds to a vehicle type of the first vehicle; and
recognizing, based on the set recognition method, the operation indicated by the gesture of the user.

16. A signal processing system, comprising:
a signal processing device including:
a setting unit configured to set, based on vibration data, a recognition method to recognize an operation using a gesture of a user, wherein
the user is in a first vehicle equipped with the signal processing device,
the vibration data indicates vibrations predicted to occur in the first vehicle in the future,
the vibration data further indicates the vibrations detected by a second vehicle that has travelled ahead of the first vehicle, through a predicted position where the first vehicle is predicted to travel in the future, and a vehicle type of the second vehicle corresponds to a vehicle type of the first vehicle; and an operation recognition unit configured to recognize, based on the set recognition method, the operation indicated by the gesture of the user; and a display device including a display unit configured to display an image on which the operation using the gesture is performed.

17. The signal processing system according to claim 16, further comprising:

a server, wherein the server includes a management unit, the management unit is configured to manage the vibration data, the vibration data is associated with a position where the vibrations indicated by the vibration data are detected, and the setting unit is further configured to set the recognition method based on the vibration data acquired from the server.

* * * * *